United States Patent
Joho et al.

(10) Patent No.: US 12,511,090 B2
(45) Date of Patent: Dec. 30, 2025

(54) VEHICLE DISPLAY SYSTEM, DISPLAY SYSTEM, DISPLAY METHOD, AND NON-TRANSITORY COMPUTER READABLE STORAGE MEDIUM

(71) Applicant: DENSO CORPORATION, Kariya (JP)

(72) Inventors: Yasuhiko Joho, Kariya (JP); Kiyotaka Taguchi, Kariya (JP); Akira Kamiya, Kariya (JP); Hiroyuki Mimura, Kariya (JP); Toshinori Mizuno, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/465,552

(22) Filed: Sep. 12, 2023

(65) Prior Publication Data

US 2023/0418541 A1    Dec. 28, 2023

Related U.S. Application Data

(63) Continuation of application No. PCT/JP2022/015567, filed on Mar. 29, 2022.

(30) Foreign Application Priority Data

Apr. 23, 2021  (JP) .................. 2021-073378

(51) Int. Cl.
  *G06F 3/14*  (2006.01)
  *B60K 35/00*  (2024.01)
  (Continued)

(52) U.S. Cl.
  CPC ............ *G06F 3/1446* (2013.01); *B60K 35/00* (2013.01); *B60K 35/10* (2024.01); *B60K 35/22* (2024.01);
  (Continued)

(58) Field of Classification Search
  CPC ............ G09G 2300/026; G06F 3/1423; G06F 3/1446; H04N 9/3147
  See application file for complete search history.

(56) References Cited

U.S. PATENT DOCUMENTS

| 8,400,370 | B2 * | 3/2013 | Yoshida | ................ G06F 3/1446 345/1.3 |
| 8,410,993 | B2 * | 4/2013 | Jenks | ....................... H04N 9/12 345/1.3 |

(Continued)

FOREIGN PATENT DOCUMENTS

| JP | 2002006822 A | 1/2002 |
| JP | 2005227579 A | 8/2005 |

(Continued)

*Primary Examiner* — Sepehr Azari
(74) *Attorney, Agent, or Firm* — Harness, Dickey & Pierce, P.L.C.

(57) ABSTRACT

A display system displays on a first display screen of a first display and a second display screen of a second display arranged side by side with a non-display area sandwiched between the first display screen and the second display screen. The display system includes: a determination unit that determines whether a content includes information necessary for an user when the content across the first display screen and the second display screen is displayed to bridge the non-display area; and a display processing unit that displays the content by changing a display area based on a determination result of the determination unit.

18 Claims, 18 Drawing Sheets

(51) Int. Cl.
- *B60K 35/10* (2024.01)
- *B60K 35/22* (2024.01)
- *B60K 35/29* (2024.01)
- *G06F 3/147* (2006.01)
- *B60K 35/53* (2024.01)
- *G06F 3/16* (2006.01)

(52) U.S. Cl.
CPC .............. *G06F 3/147* (2013.01); *B60K 35/29* (2024.01); *B60K 35/53* (2024.01); *B60K 2360/182* (2024.01); *B60K 2360/186* (2024.01); *B60K 2360/332* (2024.01); *G06F 3/16* (2013.01)

(56) References Cited

U.S. PATENT DOCUMENTS

| | | | | |
|---|---|---|---|---|
| 8,982,070 | B2* | 3/2015 | Tomimori | G06F 3/1446 345/173 |
| 8,988,313 | B2* | 3/2015 | Takishita | G06F 3/1446 345/1.3 |
| 9,703,518 | B2* | 7/2017 | Yamakita | G06F 3/0481 |
| 9,870,193 | B2* | 1/2018 | Kim | G09G 5/14 |
| 11,175,874 | B2* | 11/2021 | Lim | G09G 5/391 |
| 11,194,536 | B2* | 12/2021 | Liu | G06F 3/0481 |
| 2010/0033402 | A1* | 2/2010 | Yoshida | G06F 3/1446 345/1.3 |
| 2010/0123732 | A1* | 5/2010 | Jenks | H04N 9/12 345/592 |
| 2010/0188352 | A1* | 7/2010 | Ikeda | G06F 1/1647 345/173 |
| 2010/0201702 | A1* | 8/2010 | Franik | G09G 3/001 345/589 |
| 2010/0321410 | A1* | 12/2010 | Jenks | G09G 5/005 345/676 |
| 2011/0109526 | A1 | 5/2011 | Bauza et al. | |
| 2011/0260997 | A1* | 10/2011 | Ozaki | G06F 1/1692 345/173 |
| 2012/0133674 | A1* | 5/2012 | Takishita | G06F 3/1446 345/619 |
| 2012/0139947 | A1* | 6/2012 | Kishima | G06F 3/1446 345/660 |
| 2012/0218216 | A1* | 8/2012 | Tomimori | G06F 3/0488 345/173 |
| 2012/0242685 | A1* | 9/2012 | Ohtake | G06F 3/1446 345/619 |
| 2014/0098006 | A1* | 4/2014 | Jenks | G06F 3/1446 345/1.3 |
| 2014/0368512 | A1* | 12/2014 | Kim | G06F 3/1446 345/474 |
| 2015/0254041 | A1* | 9/2015 | Hoshihara | G06F 3/1446 345/173 |
| 2015/0268465 | A1* | 9/2015 | Nagata | B60K 35/60 345/1.1 |
| 2015/0268917 | A1* | 9/2015 | Leppanen | G06F 3/1446 345/1.3 |
| 2015/0370322 | A1* | 12/2015 | Gustafson | G09G 5/363 345/156 |
| 2016/0224222 | A1* | 8/2016 | Mori | B60K 35/00 |
| 2016/0350057 | A1* | 12/2016 | Kwon | H04W 88/02 |
| 2016/0364838 | A1* | 12/2016 | Stillman | B60K 35/60 |
| 2017/0192733 | A1* | 7/2017 | Huang | G06F 3/1446 |
| 2017/0305342 | A1* | 10/2017 | Tomioka | G08G 1/16 |
| 2017/0322760 | A1* | 11/2017 | Soh | G06F 3/1431 |
| 2018/0173486 | A1* | 6/2018 | Kim | G06F 3/1446 |
| 2018/0178597 | A1* | 6/2018 | Min | B60K 35/10 |
| 2019/0061530 | A1* | 2/2019 | Devshatwar | B60K 35/50 |
| 2019/0107989 | A1* | 4/2019 | Mizobe | G16H 40/63 |
| 2019/0213932 | A1* | 7/2019 | Yoneyama | G03B 21/00 |
| 2020/0034102 | A1* | 1/2020 | Hirota | B60K 35/00 |
| 2020/0150916 | A1* | 5/2020 | Jiang | B60R 11/0235 |
| 2020/0225899 | A1* | 7/2020 | Lim | G06F 3/1446 |
| 2021/0241717 | A1* | 8/2021 | Matsui | G06F 3/1446 |
| 2022/0365738 | A1* | 11/2022 | Li | G09G 3/32 |

FOREIGN PATENT DOCUMENTS

| | | |
|---|---|---|
| JP | 2012243073 A | 12/2012 |
| JP | 2013023081 A | 2/2013 |
| JP | 2017097120 A | 6/2017 |
| JP | 2017187758 A | 10/2017 |
| JP | 2019047224 A | 3/2019 |
| JP | 2020008740 A | 1/2020 |
| WO | WO-2011074595 A1 | 6/2011 |

* cited by examiner

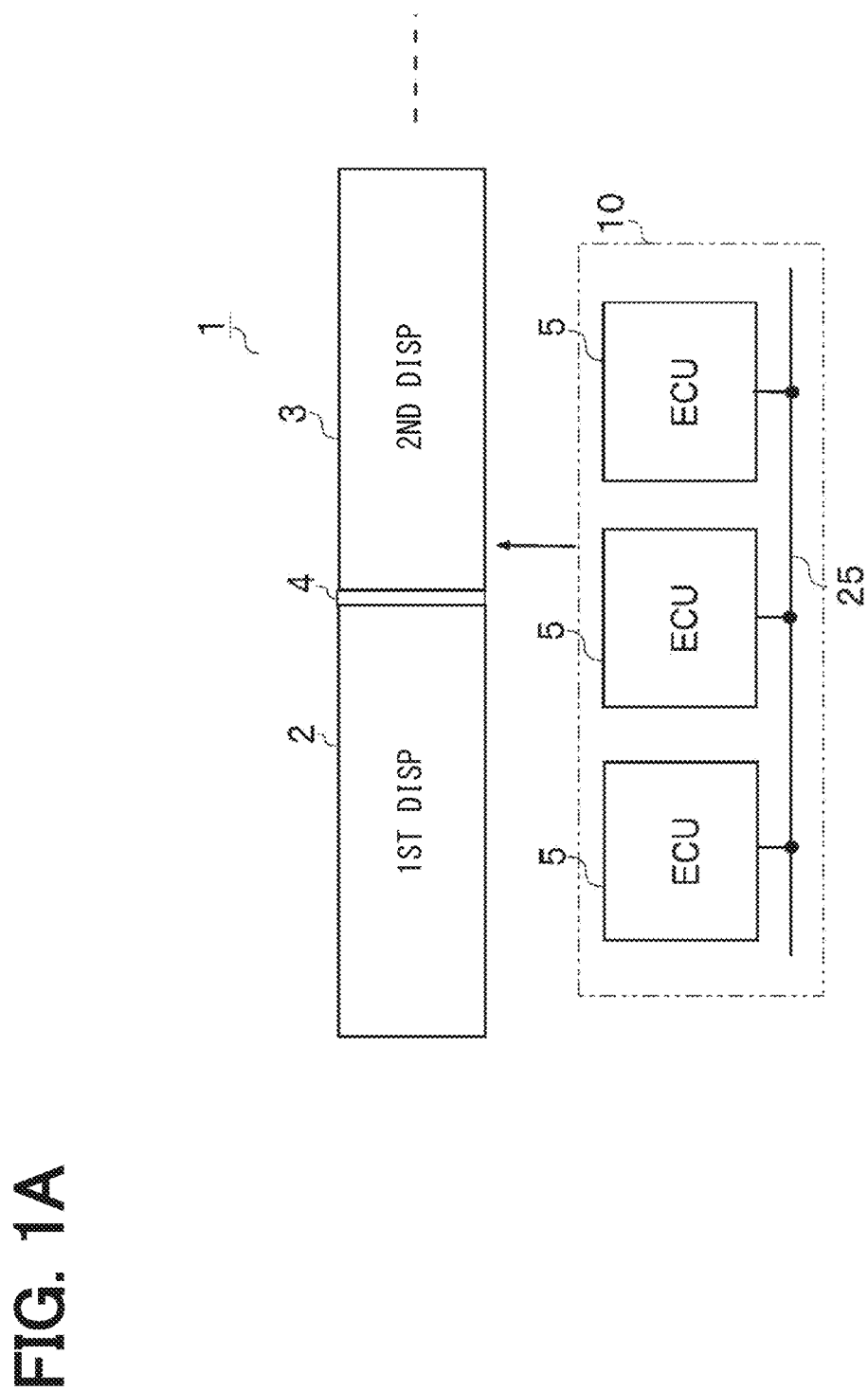

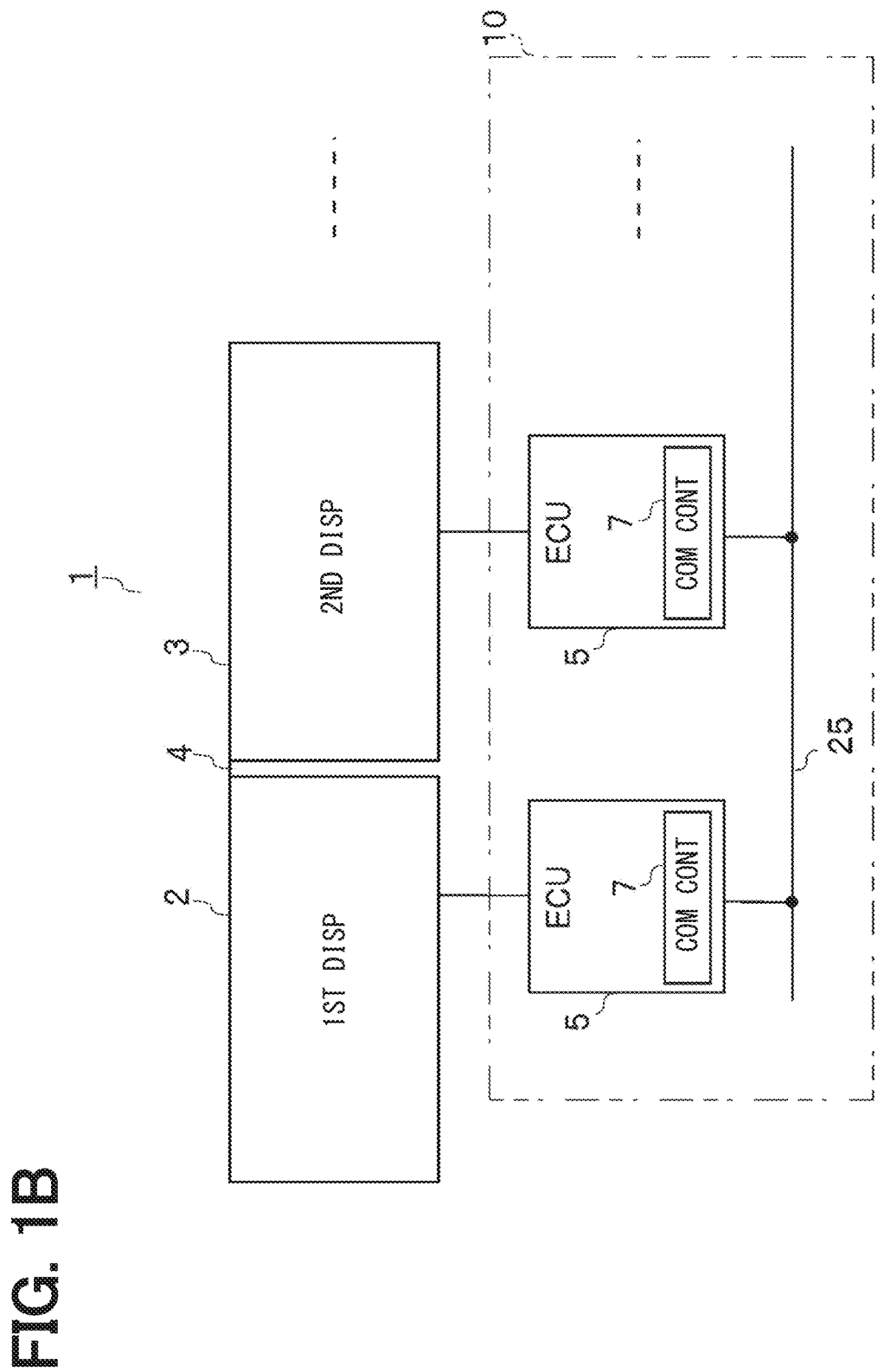

VEHICLE DISPLAY SYSTEM, DISPLAY SYSTEM, DISPLAY METHOD, AND NON-TRANSITORY COMPUTER READABLE STORAGE MEDIUM

CROSS REFERENCE TO RELATED APPLICATIONS

The present application is a continuation application of International Patent Application No. PCT/JP2022/015567 filed on Mar. 29, 2022, which designated the U.S. and claims the benefit of priority from Japanese Patent Application No. 2021-073378 filed on Apr. 23, 2021. The entire disclosures of all of the above applications are incorporated herein by reference.

TECHNICAL FIELD

The present disclosure relates to a vehicle display system, a display system, a display method, and non-transitory computer readable storage medium.

BACKGROUND

In recent years, displays such as liquid crystal displays and organic EL displays are required to be enlarged so that a large amount of information can be viewed at once. On the other hand, there is also a demand for displaying one large design.

For example, according to a conceivable technique, when an image is displayed across a plurality of displays, a part of the image that overlaps the non-display area of the displays is cut out and displayed.

SUMMARY

According to an example, a display system displays on a first display screen of a first display and a second display screen of a second display arranged side by side with a non-display area sandwiched between the first display screen and the second display screen. The display system may include: a determination unit that determines whether a content includes information necessary for an user when the content across the first display screen and the second display screen is displayed to bridge the non-display area; and a display processing unit that displays the content by changing a display area based on a determination result of the determination unit.

BRIEF DESCRIPTION OF THE DRAWINGS

The above and other objects, features and advantages of the present disclosure will become more apparent from the following detailed description made with reference to the accompanying drawings. In the drawings:

FIG. 1A is an explanatory diagram showing a configuration example of a display and a control image in the first embodiment;

FIG. 1B is an explanatory diagram of a control image of a vehicle display system;

DETAILED DESCRIPTION

Figure 2:
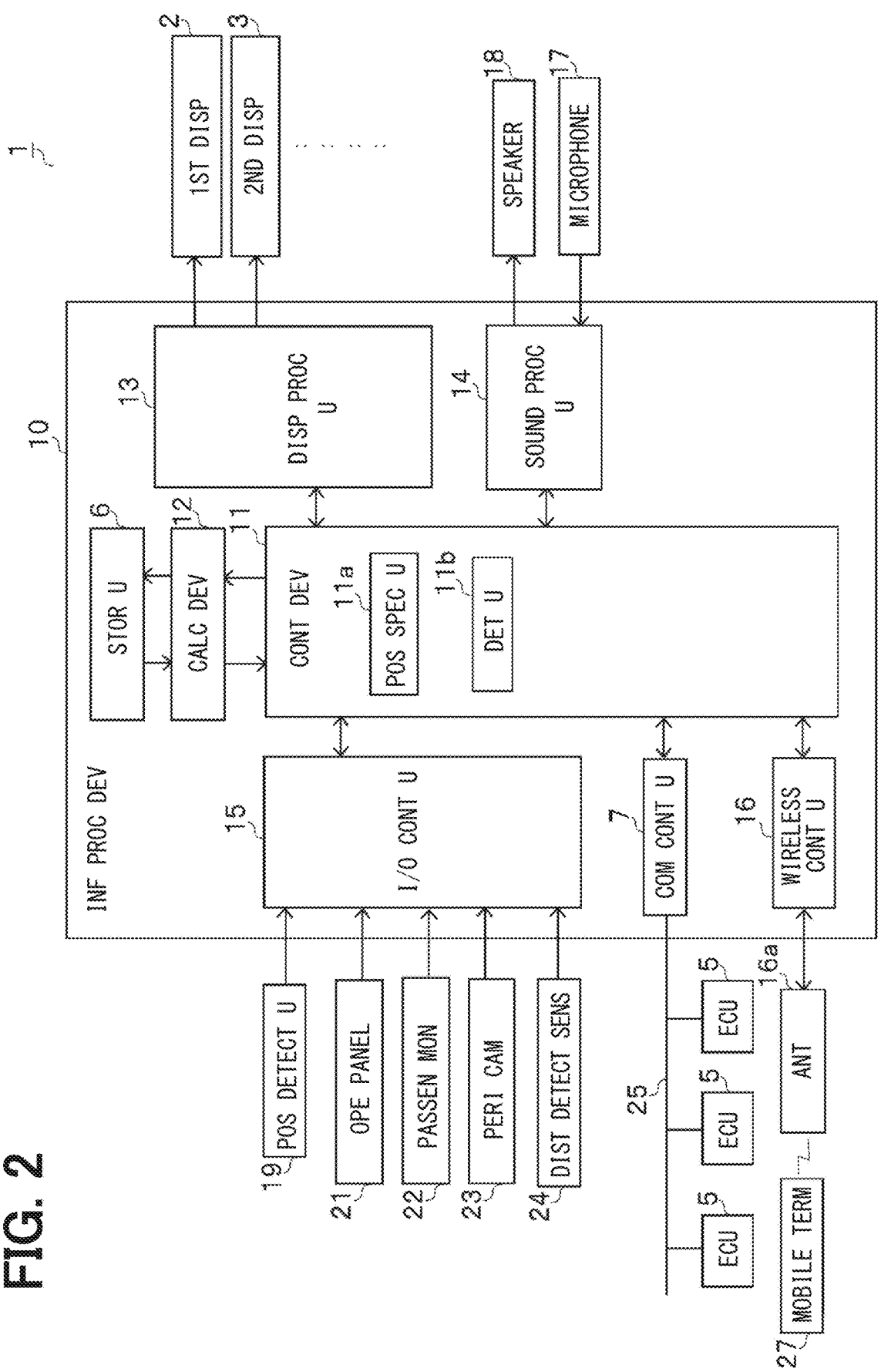
FIG. 2 is a block diagram schematically showing the vehicle display system.

According to a conceivable technique, if the image overlapping the non-display area is simply cut out, information important to the user may be lost.

An object of the present embodiments is to provide a vehicle display system, a display system, a display method, and a display program capable of accurately displaying information to a user without missing information important to the user.

According to one aspect of the present embodiments, a vehicle display system displays an image on a first display screen of a first display and a second display screen of a second display provided side by side with a non-display area between the first display screen and the first display screen. According to one aspect of the present disclosure, a determination unit determines whether an image disposed in a non-display area indicates information necessary for the user viewing the first display screen and the second display screen when a content of an integrated image, text, text, characters, or symbols across the first display screen and the second display screen is displayed to cross over the non-display area.

At this time, the display process unit changes and displays the display area of the content to be displayed on the first display screen and the second display screen based on the determination result of the determination unit. Therefore, information can be appropriately displayed to the user without missing information important to the user.

Several embodiments of a vehicle display system and a display system will be described below with reference to the drawings. In the following description, the same reference numerals are given to substantially the same portions according to the embodiments.

First Embodiment

A first embodiment will be described with reference to FIGS. 1A to 14. As shown in FIG. 1A, a display system 1 includes a plurality of displays such as a first display 2 and a second display 3. In this embodiment, in order to simplify the explanation, a feature in which two displays of the first display 2 and the second display 3 are arranged side by side is exemplified, alternatively, it may not be limited to this feature, and three or more displays may be arranged side by side.

As shown in FIG. 1A, the first display 2 and the second display 3 are arranged side by side. The first display 2 includes a liquid crystal display, an organic EL display, or the like. The first display 2 has a configuration that is capable of displaying various image content in a full graphic display manner, such as a meter image, a photographing image of a periphery camera 23, an entertainment image of a still picture and a motion picture, and a map image around a current position of a vehicle, in case of vehicle application.

On the other hand, the second display 3 includes similarly a liquid crystal display, an organic EL display, or the like. The second display 3 has a configuration that is capable of displaying various image content in a full graphic display manner, such as a meter image, a photographing image of a periphery camera 23, an entertainment image of a still picture and a motion picture, and a map image around a current position of a vehicle, in case of vehicle application. When multiple screens are arranged side by side, the display area that can be visually recognized by the user at one time can be increased.

In the vehicle, as shown in FIGS. 1A, 1B and 2, a large number of ECUs 5 are configured and connected to an in-vehicle network 25. The ECU 5 includes a display system ECU, a periphery monitoring system ECU, a drive control system ECU, and a DCM that communicates with the outside of the vehicle. DCM stands for data communication module. The drive control system ECU includes a well-known vehicle control ECU, an engine control ECU, a motor control ECU, a brake control ECU, a steering control ECU, an integrated control ECU, and the like. The drive control system ECU includes an autonomous driving ECU. The autonomous driving ECU is an autonomous driving electric control unit.

When the autonomous driving ECU receives an autonomous control signal, the ECU executes a driving support operation and an autonomous driving operation with a certain corresponding level by operating a driving actuator. For example, the driving support with level 1 includes an automatic braking operation to avoid collisions with obstacles, a follow-up driving operation that follows the preceding vehicle, and a lane-departure prevention driving operation that controls the vehicle so that it does not stray from the lanes on both sides. In the autonomous driving with level II, a combination of the driving support with level I, or an autonomous driving operation under specific conditions for executing an autonomous driving mode in which the vehicle automatically overtakes a slow vehicle on an expressway or automatically merging and diverging on an expressway. Here, in the autonomous driving with level II, the driver is obliged to monitor the autonomous driving operation. In the autonomous driving with level III and above, the system performs all driving tasks while being monitored by the system.

Each ECU 5 mainly includes a microcomputer having a processor, various storage units 6 such as a cache memory, a RAM, and a ROM, an I/O interface, and a bus connecting them. Each ECU 5 is communicably connected to other ECUs 5 provided in the vehicle through the communication control unit 7 and the in-vehicle network 25.

In this embodiment, as shown in FIGS. 1A and 1B, a plurality of display system ECUs 5 constitute an HCU as an information processing device 10. As shown in FIG. 1B, the display system ECU 5 shares the processing capacity of the internal physical resources, and for example, each ECU 5 performs display processing on the displays 2 and 3 individually. The HCU is an abbreviation for human machine interface control unit. Although a feature in which the in-vehicle network 25 is connected between a plurality of display system ECUs 5 is described, the connection may be made by a dedicated line. The storage unit d is a non-transitory tangible storage medium for non-transitory storage of computer readable programs and data. The non-transitory tangible storage medium is implemented by a semiconductor memory or the like.

As shown in FIG. 2, the information processing device 10 includes a control device 11, a calculation device 12, a storage unit 6, a display processing unit 13, a sound processing unit 14, an I/O control unit 15 that manages input or output from various devices, a communication control unit 7 for managing communication with another ECU 5, and a wireless control unit 16 configured by connecting an antenna 16a to enable wireless connection with another mobile terminal 27 by wireless LAN or Bluetooth (registered trademark). Here, a feature of inputting/outputting of main components through the I/O control unit 15 will be described, alternatively, the inputting into and outputting from other ECUs 5 such as the periphery monitoring ECU and the driving control ECU via the in-vehicle network 25 may be performed.

The wireless control unit 16 establishes a communication link with a mobile terminal 27 possessed by the user of the vehicle. The information processing device 10 waits for an incoming call to the mobile terminal 27, and when the mobile terminal 27 receives an incoming call from the other party and answer the incoming call, the information processing device 10 communicates with the other party through the speaker 18 and the microphone 17 via the mobile terminal 27. Further, the information processing device 10 can recognize voice input through the microphone 17.

The calculation device 12 calculates the display area for displaying, on the display screen of the display 2, 3, a content such as images, sentences, characters, or symbols (hereinafter referred to as images and the like) stored in storage unit 6 based on the control of the control device 11, calculates in which area of the display screens of the displays 2 and 3 the content such as the image and the like is to be displayed, and in which area the image and the like is to be superimposed and displayed, and outputs the display area together with the content such as an image to the control device 11. The symbol here is a general term for not only the original symbol, but also the content such as traffic signs that are represented by icons. Specifically, the symbol indicates the information other than the image, the sentence and the character to be displayed on the displays 2, 3 according to the navigation function.

The display processing unit 13 performs the display process of the content such as the image and the like in the above-described display areas in the display screens of the displays 2 and 3 under the control of the control device 11. As a result, on the display screens of the displays 2 and 3, one content can be displayed for each display layer, or the content such as a plurality of images can be superimposed and displayed. Under the control of the control device 11, the sound processing unit 14 receives a reception voice input from the microphone 17 and outputs a transmission voice from the speaker 18. When the sentence content and the character content are input from the control device 11, the sound processing unit 14 converts them into voice, reads them out through the speaker 18, and outputs them.

The position detection unit 19 detects a position with high accuracy using a well-known GNSS receiver such as GPS (not shown) and an inertial sensor such as an acceleration sensor or a gyro sensor. The position detection unit 19 outputs a position detection signal to the control device 11 through the I/O control unit 15. The position specification unit 11a of the control device 11 realizes a function as an ADAS locator that sequentially measures the current position of the vehicle with high accuracy based on the map information input from the map data input device and the position detection signal of the position detection unit 19. ADAS is an abbreviation for advanced driver assistance systems. The vehicle position is represented in a coordinate system using latitude and longitude. In this coordinate system, for example, x-axis indicates longitude and y-axis indicates latitude It should be noted that the specifying of the vehicle position may be executed in various manners in addition to the above-described method. For example, the position of the vehicle may be specified based on travelling distance information obtained from the detection result by a vehicle speed sensor mounted on the subject vehicle. The control device 11 can perform a so-called navigation process based on the current position of the subject vehicle.

The operation panel 21 is a touch panel configured on a predetermined display, for example, the display 3, and the I/O control unit 15 receives an operation input from the user and outputs the operation input to the control device 11. The control device 11 executes control based on operation signals from the operation panel 21.

The passenger monitor 22 detects the state of the user in the vehicle or the operation state. The passenger monitor 22 is configured using, for example, a power switch, a passenger state monitor, a turn switch, an autonomous control switch, and the like, and outputs various signals to the control device 11. The passenger monitor 22 may include a steering sensor that detects whether the steering wheel is being gripped or steered by the driver, a seating sensor that detects whether the driver is seated, an accelerator pedal or brake pedal depression sensor, and the like.

The power switch is turned on by a user in the vehicle compartment in order to start the internal combustion engine or the electric motor, and outputs a signal corresponding to the operation. The passenger state monitor includes a camera that detects the state of the user in the D seat or the P seat by photographing the state of the user with an image sensor and outputs an image signal. The driver's passenger state monitor is called DSM. The DSM is an abbreviation for driver status monitor. The passenger state monitor obtains an image signal obtained by irradiating the face of the driver with near-infrared light and capturing an image, analyzes the image as necessary, and outputs the signal to the control device 11. The passenger state monitor is used to detect the state of a user such as a driver, especially during the driving support operation or the autonomous driving operation. The turn switch is turned on by a user in the vehicle compartment to activate the direction indicator of the vehicle, and outputs a turn signal for turning right or left according to the operation.

The autonomous control switch outputs an autonomous control signal in response to the user's operation when the user in the vehicle compartment executes an on operation in order to command an autonomous control of the driving state of the vehicle. The control device 11 can determine the behavior of the user of the vehicle, for example, in which direction the line of sight is directed, based on the signal from the passenger monitor 22. Further, the control device 11 can also input the operation state of the power switch, the operation state of the direction indicator, the command information of the autonomous control of the vehicle, and the like.

The periphery camera 23 provides a periphery monitor sensor such as a front camera that images the front of the vehicle, a back camera that images the rear of the vehicle, a corner camera that images the front side and the rear side of the vehicle, a side camera that images the side of the vehicle, and an electronic mirror. These sensors output each image signal of the front guide monitor, the back guide monitor, the corner view monitor, the side guide monitor, and the electronic mirror to the control device 11 through the I/O control unit 15, to store as respective imaging signals in the storage unit 6. The communication control unit 7 is connected to an in-vehicle network 25 such as CAN or LIN, and controls data communication with other ECUs 5.

A distance detection sensor 24 for detecting the distance to an obstacle is installed in the vehicle as a periphery monitor sensor. The distance detection sensor 24 includes a clearance sonar, a LiDAR, a millimeter wave radar, and the like, and detects vehicles, people, animals, fallen objects on the road, guardrails, curbs, trees, and the like approaching near the front of the vehicle, the front side of the vehicle, the rear side of the vehicle, the rear of the vehicle, or the side of the vehicle. It can also detect the azimuth to the obstacle and the distance to the obstacle. In addition, with the above-mentioned periphery monitor sensor, it is possible to detect road markings such as traffic lane lines, stop lines, and pedestrian crossings painted on the road around the vehicle, traffic signs such as a "stop" sign painted on the road, and a stop line painted at a boundary of an intersection.

Figure 3:
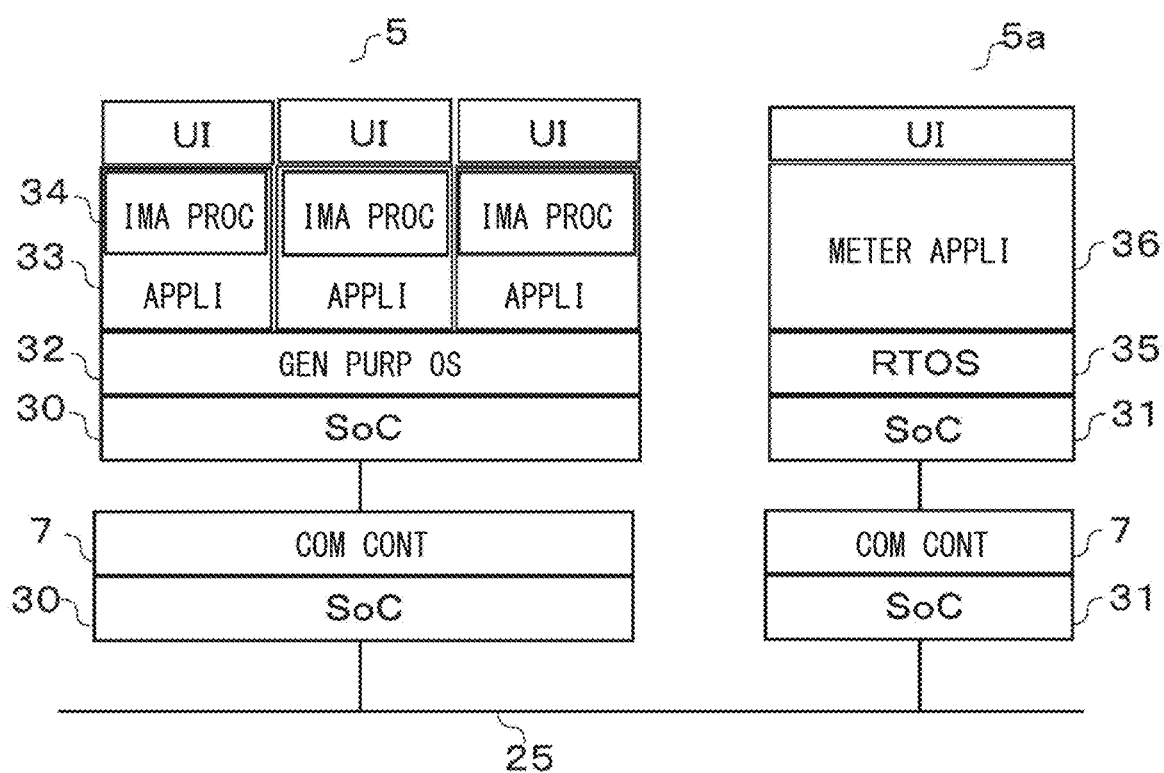
FIG. 3 is a configuration diagram schematically showing the hardware and software.

FIG. 3 shows an example of the hardware and software configuration of the information processing device 10. SoCs 30 and 31 are equipped on ECUs 5 and 5a, respectively, and the above-described microcomputers are equipped in the mounted SoCs 30 and 31, respectively. The microcomputers equipped in the SoCs 30 and 31 of the ECU 5 are configured to operate various applications (hereinafter abbreviated as apps) on a pre-installed general-purpose OS 32, such as Linux OS (Linux is a registered trademark). SoC is an abbreviation for System On Chip.

The application 33 includes the image processing application 34 and other applications. A processor equipped in the SoC 30 performs a drawing process on the display screen of each display 2a of the first display 2 in response to a drawing request from the image processing application 34.

On the other hand, since the ECU 5a is provided for drawing a meter, the symbol 5a is attached. On the microcomputer equipped in the SoC 31 of the ECU 5a, a real-time OS 35 capable of processing with higher real-time performance than the general-purpose OS 32 is installed, and a meter application 36 is operated on the real-time OS 35.

Note that the following description may focus on the applications 33 such as the image processing application 34 and the meter application 36.

The meter application 36 notifies the user of vehicle speed, number of rotations, warnings, and the like. An image content to be displayed in a specific display area of the first display 2 is drawn. For example, the meter application 36 draws the image content such as a speedometer, a tachometer, a shift range position state, or a warning light. The speedometer includes a speed image whose display needs to be updated in real time to show changes in the speed of the vehicle. Similarly, the tachometer is also included in the meter image, as the display needs to be updated in real time to show changes in the number of rotations. The communication control unit 7 communicates with other ECUs 5 through an in-vehicle network 25 such as CAN and LIN.

A content to be drawn by the meter application 36 can also be displayed on another display, for example, the second display 3. The content to be drawn by the meter application 36 is required to have relatively more real-time performance than the content drawn by other applications.

The application 33 includes a navigation application and the like. The navigation application realizes the navigation function described above, and mainly draws an image content such as a navigation screen including the map and the current position of the vehicle on the first display 2 or the second display 3.

The application 33 also includes an image synthesizing application. The image synthesizing application is an application for specifying sizes and types of various image contents to be displayed on the display device, synthesizing images of the image contents in one frame, and outputting the synthesized mixed image on the first display 2 and the second display 3. The image synthesizing application implements a function as an image synthesizing unit, also called a compositor, and a function as an image output unit.

Among the applications 33 and 36, the application that draws the image content is assigned a display layer for drawing the image content. These display layers are secured on the storage unit 6 in a size capable of drawing necessary image contents.

Also, the image content to be displayed on the first display 2 and the second display 3 can be animated. Here, the animation operation is a display mode in which a position and a size of an image indicating the content gradually change, the image rotates, the user interface moves as a whole along with a swipe operation, the image gradually fades in or fades out, the color of the image changes, and the like.

The control device 11 shown in FIG. 2 realizes a function as the determination unit 11b when executing various processes by performing various applications 33 and 36 stored in the storage unit 6. The display processing unit 13 changes the display position of the image content to be displayed on the first display 2 and the second display 3 based on the determination result of the determination unit 11b, or changes the image content.

The operation of the above configuration will be described with reference to FIG. 4 and subsequent drawings. The information processing device 10 causes the first display 2 and the second display 3 to display various contents by the display processing unit 13. At this time, the first display screen of the first display 2 may be processed to display a single content, the second display screen of the second display 3 may be processed to display a single content, and a text content or an integrated image may be displayed across the display screens of the displays 2 and 3 as shown in FIG. 5.

When the information processing device 10 displays a single piece of content across the display screens of the displays 2 and 3, a black strip or frame-shaped non-display area 4 is generated between the first display 2 and the second display 3. At this time, a continuous image or text cannot be displayed across the displays 2 and 3, resulting in a discontinuous display, and the continuity of the display is not secured. Therefore, in order to perform display suitable for each content to be displayed, when the information processing device 10 displays an integrated image across the non-display area 4 in S1 of FIG. 4, the determination unit 11b determines whether an image or text located in the non-display area 4 is information necessary for the user who visually recognizes the display screens of the displays 2 and 3 and information leading to the user's actions.

It may be preferable that the control device 11 determines whether or not to cut out the image or text located in the non-display area 4 according to the level of importance of the information necessary for the user, using the determination unit 11b. The information necessary for the user may be preferably information related to warnings, guidance, and notifications that leads to user actions. When it is determined that the content to be displayed across the multiple displays 2 and 3 is information of high importance for the user, the image or text located in the non-display area 4 is not cut out and displayed on one of the multiple displays 2 and 3, so that the information with a high degree of importance can always be displayed on one of the displays. Conversely, when it is determined that the content to be displayed across the multiple displays 2 and 3 is information of low importance to the user, the image or text located in the non-display area 4 is cut out and not displayed on the multiple displays 2 and 3, so that the content can be displayed while maintaining the shape of the original image, and the user can be presented with a comfortable display.

Figure 4:
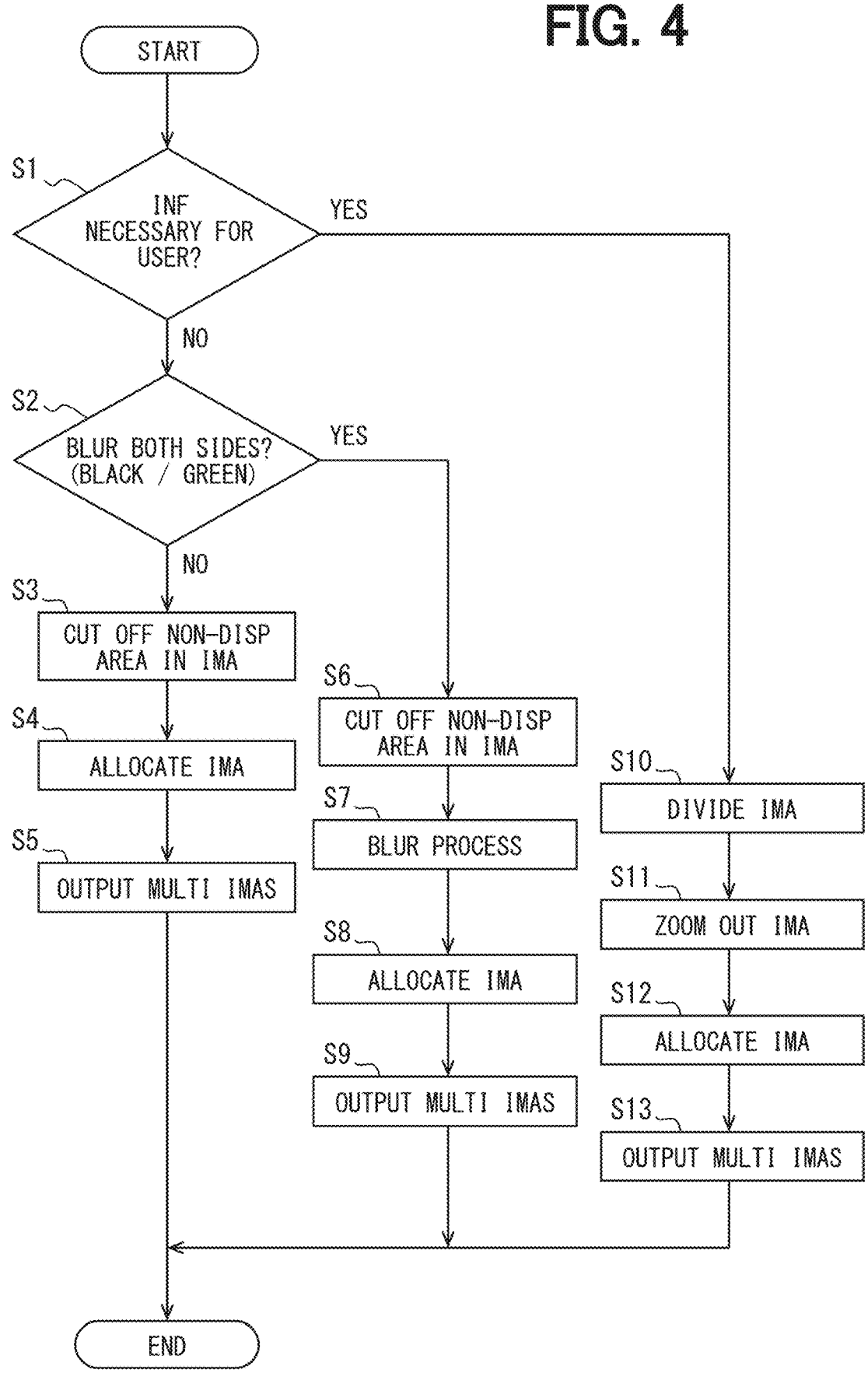
FIG. 4 is a flow chart schematically showing the contents of the processing.
Figure 5:
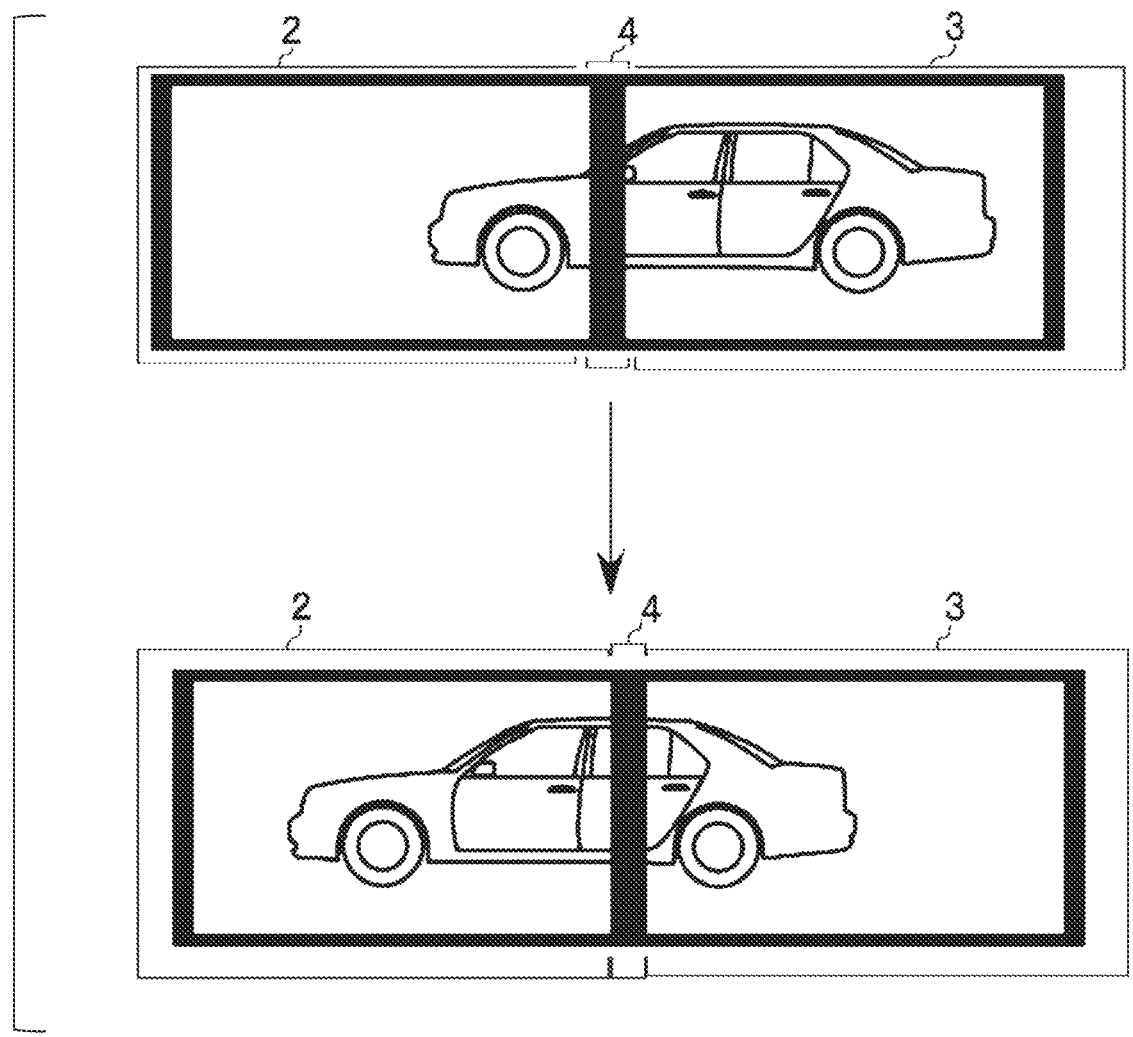
FIG. 5 is a diagram showing an example of image content to be displayed on the first display screen of the first display and the second display screen of the second display.
Figure 6:
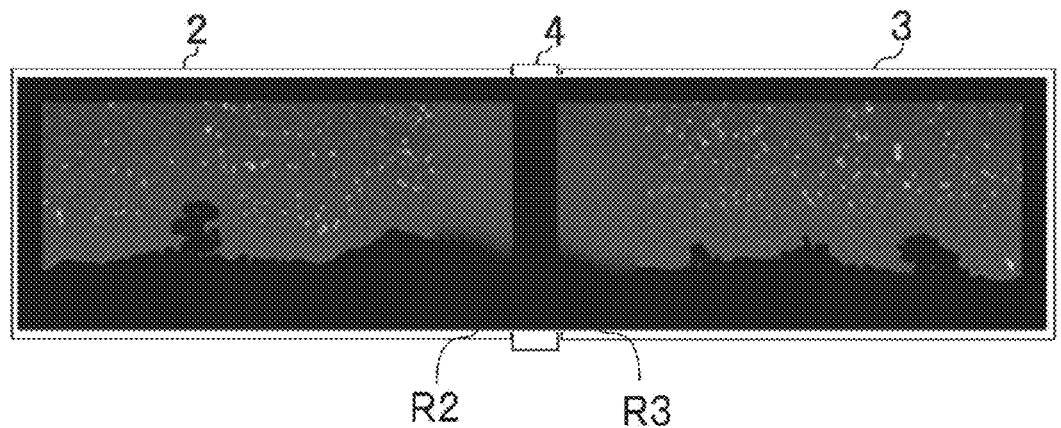
FIG. 6 is a diagram showing part 1 of an example of a display mode.

On the condition that the control device 11, using the determination unit 11b, determines that the information included in the content to be displayed across the first display 2 and the second display 3 is not information necessary for the user, the display processing unit 13 may cut out the image located in the non-display area 4 in S3 of FIG. 4, assign the image to each of the displays 2, 3 in S4, and output the image to the displays 2, 3 in S5. As a result, it is possible to cut out a portion of the image overlapping the non-display area 4 and display the portion of the image not cut out on the displays 2 and 3.

When applied to a vehicle application, contents such as still images and moving images that are not related to keywords related to safety or security may be determined to be neither necessary information for the user nor information that leads to user action, and the image located in the non-display area 4 may not be displayed on either the first display screen of the first display 2 or the second display screen of the second display 3. Applicable contents may include landscape paintings, vehicle exterior displays, music artworks and titles in the case of multimedia, opening screens and pop-up displays, and the like, and may be image content as a target related to mere information presentation that is not related to vehicle safety functions.

When the control device 11 determines in S2 of FIG. 4 that blurring of green or black is necessary, the display processing unit 13 cuts out the image located in the non-display area 4 in S6, executes a blurring process in S7, assigns the images to the displays 2 and 3 in S8, and outputs the images to the displays 2 and 3 in S9. At this time, in S7, it may be preferable to blur at least a part of the edge of the screen where the first display screen of the first display 2 and the second display screen of the second display 3 are close to each other. As shown in blurring areas R2 and R3 in FIG. 6, the display process may be performed by blurring a part of adjacent screen edges.

Figure 7:
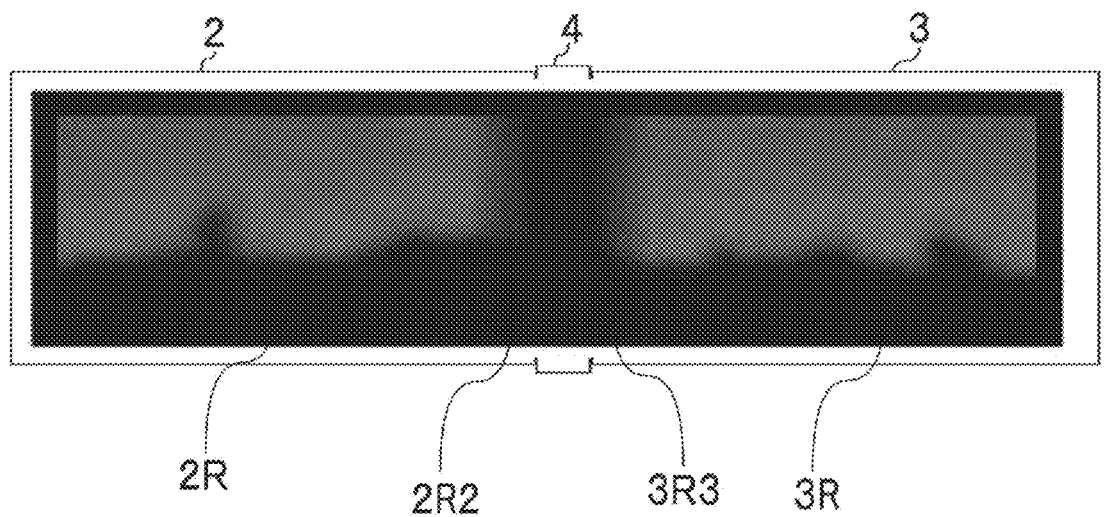
FIG. 7 is a diagram showing part 2 of the example of a display mode.

As shown in FIG. 7, when the image to be displayed is a mere background image, the entire display screen areas 2R and 3R of the displays 2 and 3 may be blurred, or the gradation process may be performed in which black is darkened as it approaches the non-display area 4 while blurring the entire display screen areas 2R and 3R of the displays 2 and 3. See the gradation processing areas 2R2 and 3R3.

When the non-display area 4 is configured in a white strip shape instead of a black strip shape, a part of the screen edge or the entire display screen may be made white. Further, when the non-display area 4 is provided in a predetermined color such as black, green, or white instead of black or white, a part of or all of the display screen may be displayed in a color similar to the predetermined color. The similar colors refer to analogous colors that have the same tone but are adjacent in terms of hue, colors that differ only in brightness or saturation, and colors prepared by combining colors different in tone but the same hue.

Conversely, when the display processing unit 13 determines that the information is necessary for the user or the information leads to the user's action based on the determination result of the determination unit 11*b*, the display processing unit 13 determines "YES" in S1 of FIG. 4, simply divides the image without cutting out the image in the non-display area 4 in S10, reduces the size of the image in S11, assigns the image to each display 2, 3 in S12, and outputs the contents of the image to the displays 2, 3 in S13. The content of the text may be divided into characters and displayed on either display screen of the displays 2 and 3.

At this time, the display processing unit 13 displays the image located in the non-display area 4 and overlapping the non-display area 4 on either of the display screens of the displays 2 and 3 without cutting out the image, so that the useful image content can be provided to the user. The text content can also be provide as the useful content in the same way.

For example, when it is applied to a vehicle application, the information located in the non-display area 4 is displayed on either of the display screens of the displays 2 and 3 for contents related to the keywords related to safety and security, thereby providing images and contents useful for the user.

In particular, for contents related to keywords relating to safety and security, an image located in the non-display area 4 may be preferably displayed on either the display screen of the first display 2 or the second display 3 in accordance with the information that changes from time to time.

Figure 8:
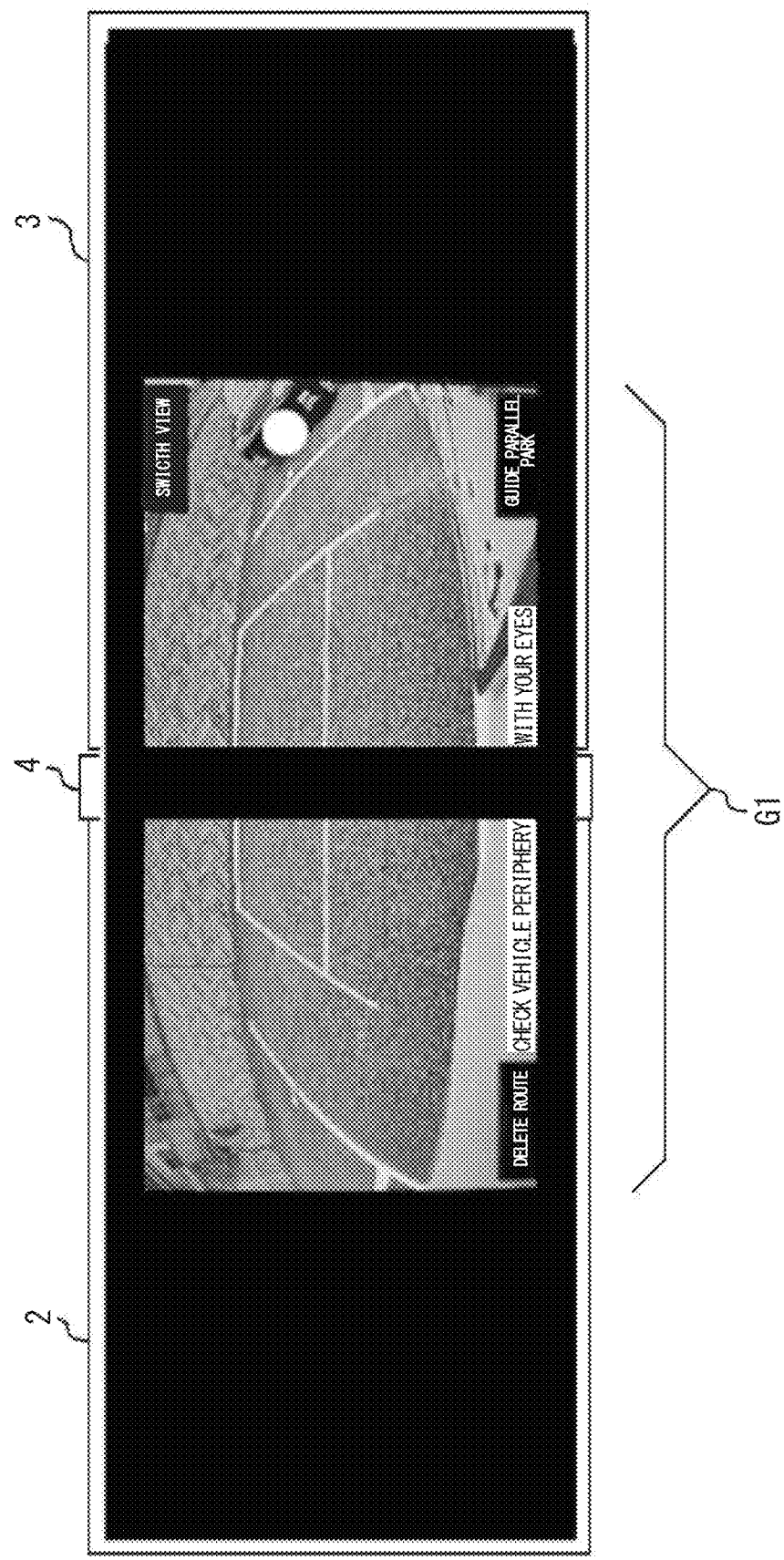
FIG. 8 is a diagram showing part 3 of the example of a display mode.
Figure 9:
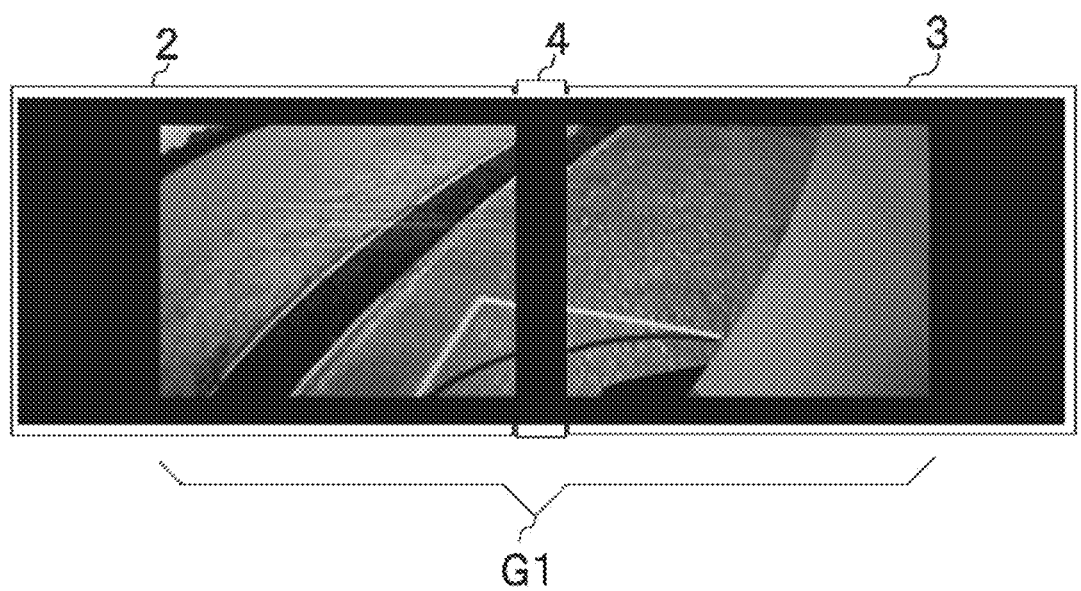
FIG. 9 is a diagram showing part 4 of the example of a display mode.

Examples of such content include a captured image G1 captured by the peripheral camera 23 for capturing the periphery of the vehicle, such as information on the back guide monitor, the front guide monitor, the corner view monitor, and the side guide monitor shown in FIGS. 8 and 9.

For example, when a part of the image G1 captured by the peripheral camera 23 located at the non-display area 4 shown in FIGS. 8 and 9 is cut out and discarded, even if the driver checks the back guide monitor in a case where the obstacle exists at the position overlapping the non-display area 4, there is a possibility that the obstacle cannot be confirmed, and the danger of colliding with the obstacle may increase. Therefore, it may be desirable to divide the captured image G1 at the center position of the non-display area 4 into halves and display them on the displays 2 and 3, respectively. Alternatively, it may be desirable that a part of the captured image G1 overlapping the non-display area 4 is moved to either one of the displays 2 and 3 for display processing.

Figure 10A:
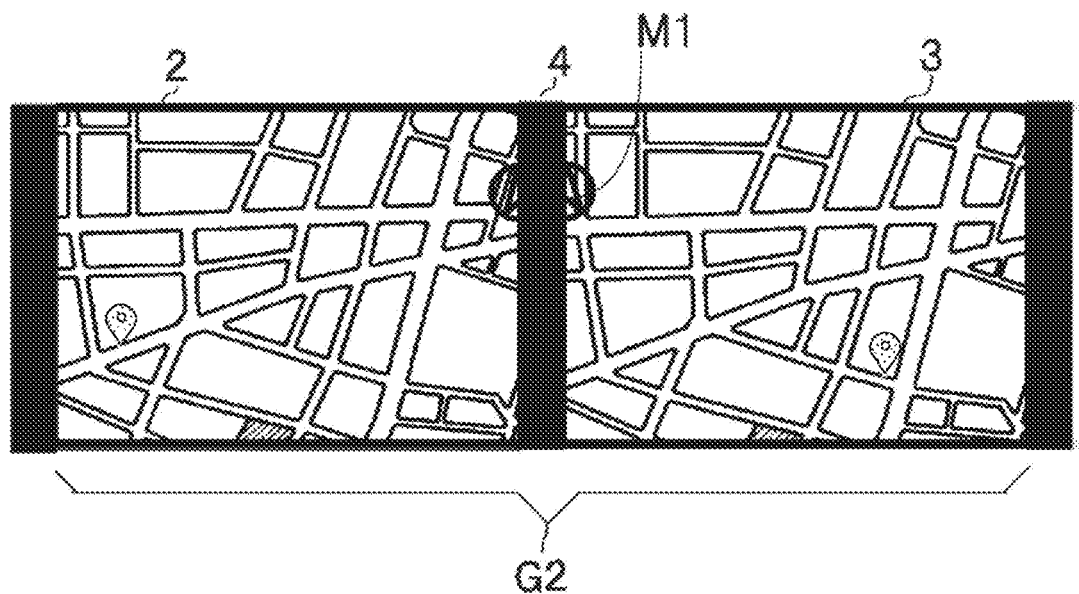
FIG. 10A is a diagram showing part 5 of the example of a display mode.

Further, for example, in the navigation map display screen G2 shown in FIG. 10A, it may be desirable to display at least a part of the display image of the current position mark M1 of the vehicle and the destination mark, and the display image of the branching guidance to the destination on either one of or both of the displays 2 and 3.

Figure 10B:
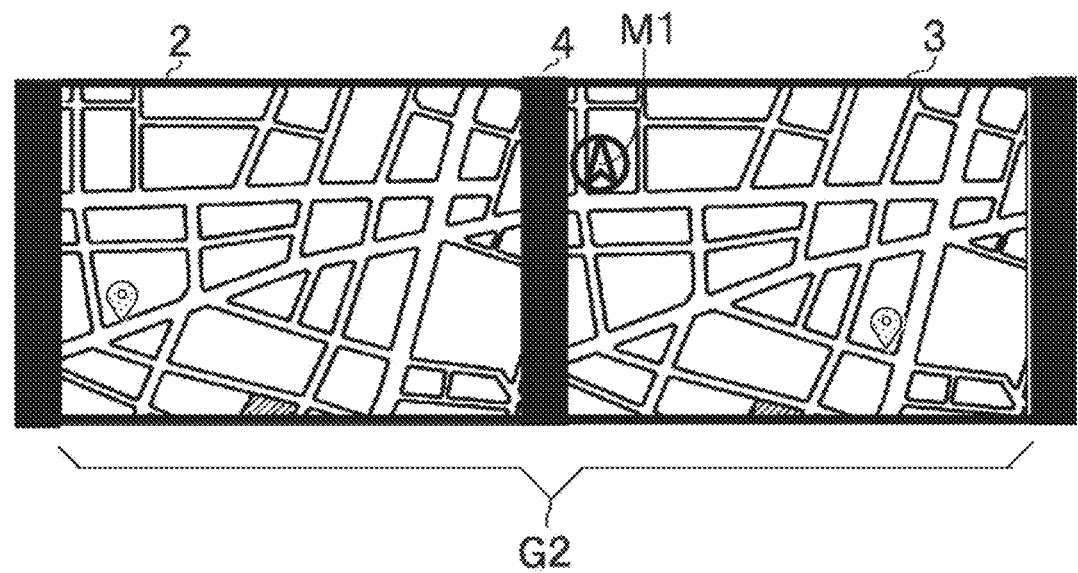
FIG. 10B is a diagram showing part 6 of the example of a display mode.

In addition, in the case of information that becomes difficult to see if it is simply divided, such as the symbol of the current position mark M1 that is configured integrally, as shown in FIG. 10B, it may be desirable to allocate the navigation image so that the symbol of the current position mark M1 is displayed integrally on either display 2 or 3 instead of dividing. Which of the displays 2 and 3 is to be displayed may be determined according to which side of the displays 2 and 3 the center of the symbol of the current position mark M1 is positioned with respect to the center of the non-display area 4. Alternatively, a rule such as displaying on the display closer to the driver may be determined to display the image. Also, in the case where a symbol such as a destination mark is displayed so as to move on the navigation map display screen G2, when the center of the symbol approaches the non-display area 4, it may be preferably to have a display mode for momentarily moving the image from either one of the displays 2 or 3 to the other. In addition to the current position mark M1 and the destination mark, when the information is desired to be unified by the user, the dividing positions may be changed so that it is displayed as integral information.

Figure 11A:
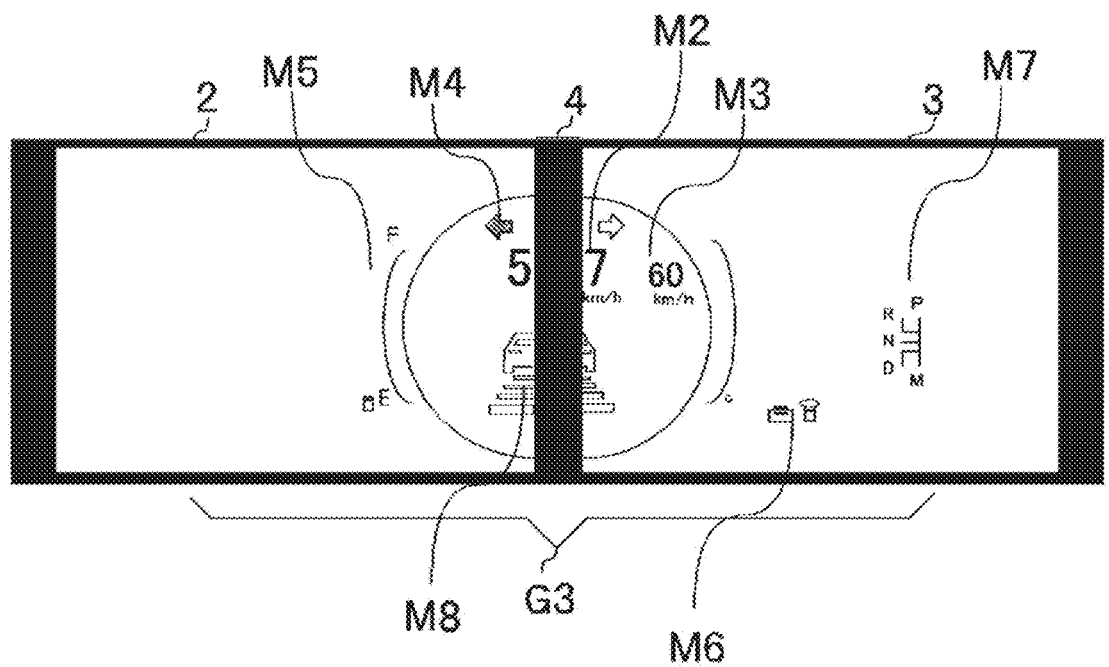
FIG. 11A is a diagram showing part 7 of the example of a display mode.

In addition, the same display mode may be applied to the display of the actual speed M2 shown in FIG. 11A, the display of the target speed M3 during autonomous driving operation or driving support operation, the blinking display of the turn direction M4 of the direction indicator, the display of the remaining amount of fuel M5, the display of warnings M6, the display of the shift range position state M7 and the display of the contents of the following state M8 following the preceding vehicle.

Figure 11B:
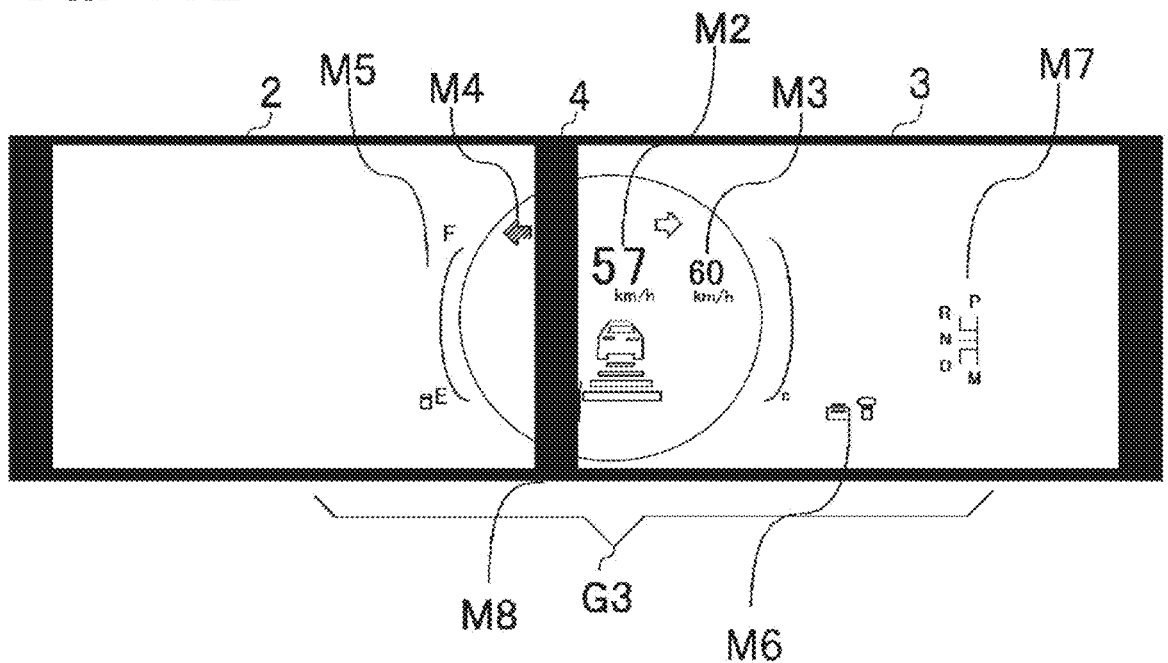
FIG. 11B is a diagram showing part 8 of the example of a display mode.

For example, as shown in FIG. 11A, the display processing unit 13 displays "57 km/h" as the actual speed M2 on the displays 2 and 3. in this case, it may be preferable to display the actual speed M2 on either of the displays 2 and 3 at least partially with respect to a part of the actual speed M2 estimated to be located at the position of the non-display area 4. When the display processing unit 13 determines that the content of the actual speed M2 or the like is integrated content when displaying the actual speed M2 or the like, it may be preferable to have the display mode that the display processing unit 13 displays "57" to integrate and move to either one of the displays 2 and 3, as shown in FIG. 11B. The same display mode may be applied to the follow-up target speed M3 during the ACC, the turn direction M4 of the direction indicator, the remaining amount of fuel M5, the warnings M6, the shift range position state M7, and the follow-up state to the preceding vehicle M8.

Figure 12:
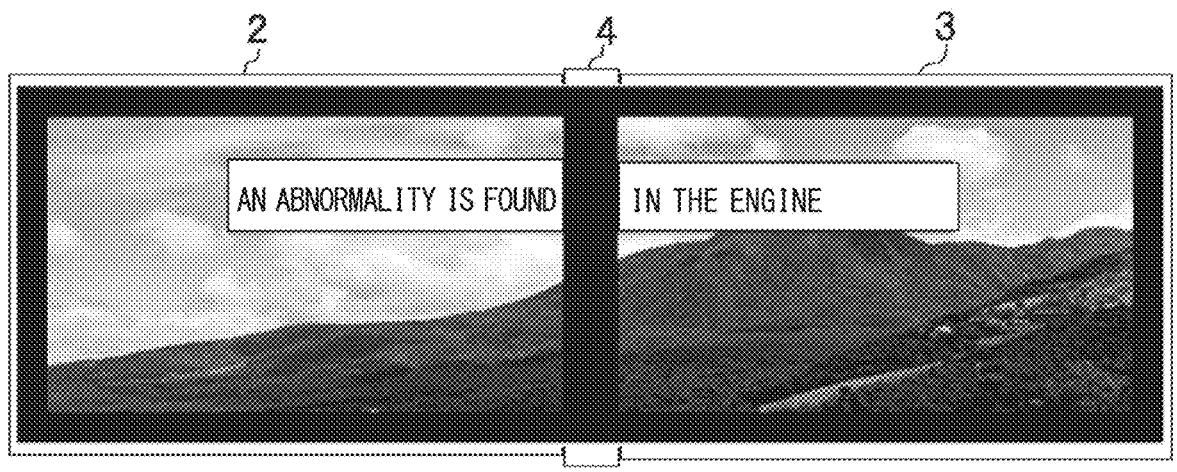
FIG. 12 is a diagram showing part 9 of the example of a display mode.
Figure 13:
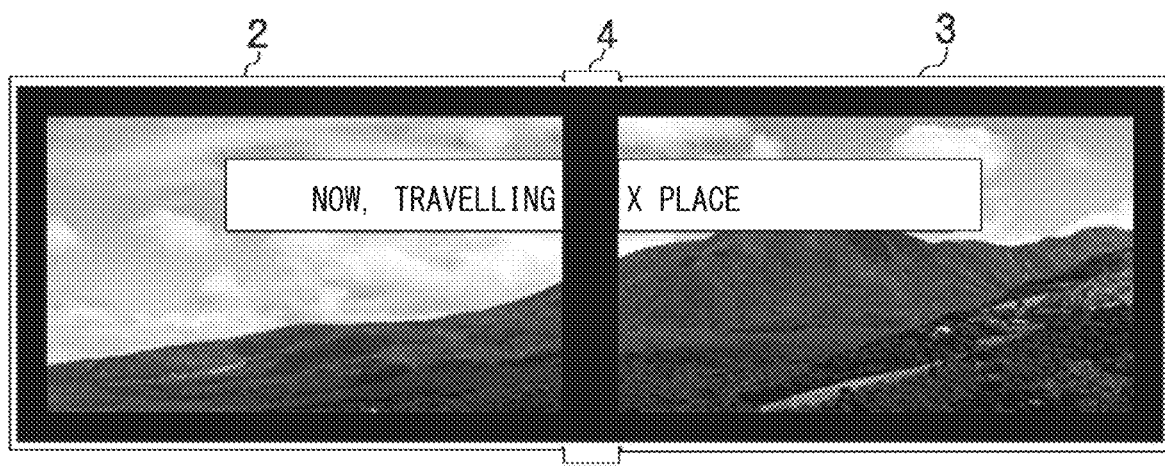
FIG. 13 is a diagram showing part 10 of the example of a display mode.

As shown in FIGS. 12 and 13, text content may be superimposed on image content. At this time, the determination unit 11*b* of the information processing device 10 may determine whether or not to cut off the display located in the non-display area 4 according to the level of importance of the information required by the user.

As exemplified in FIG. 12, when the determination unit 11b determines that the importance level of the content of the text about the engine abnormality is higher than a predetermined level, the display processing unit 13 may process displaying a part of the text content overlapping the non-display area 4 on either of the displays 2 and 3. In this case, useful information can be accurately provided to the user.

When performing the display processing for displaying the contents of the sentence "An abnormality is found in the engine" across displays 2 and 3, the word "in" may disappear between "An abnormality is found" and "the engine". However, the display processing unit 13 displays the word "in" to move to the display 3, so that it is possible to accurately provide useful information that is easy for the user to understand.

On the other hand, as shown in FIG. 13, when the determination unit 11b determines that the importance level of the content of the text of the travel location in the navigation process is lower than the predetermined level, the display processing unit 13 may cut off a part of the display located in the non-display area 4 without displaying the part on any of the display screens of the displays 2 and 3.

When displaying the contents of the sentence "Now, travelling near X place" across the displays 2 and 3, the word "near" is positioned in the non-display area 4. At this time, the display processing unit 13 cuts off a part of the display image located in the non-display area 4 and does not display the part, based on the determination result of the determination unit 11b. The necessary information is displayed so that the user can understand it.

Figure 14:
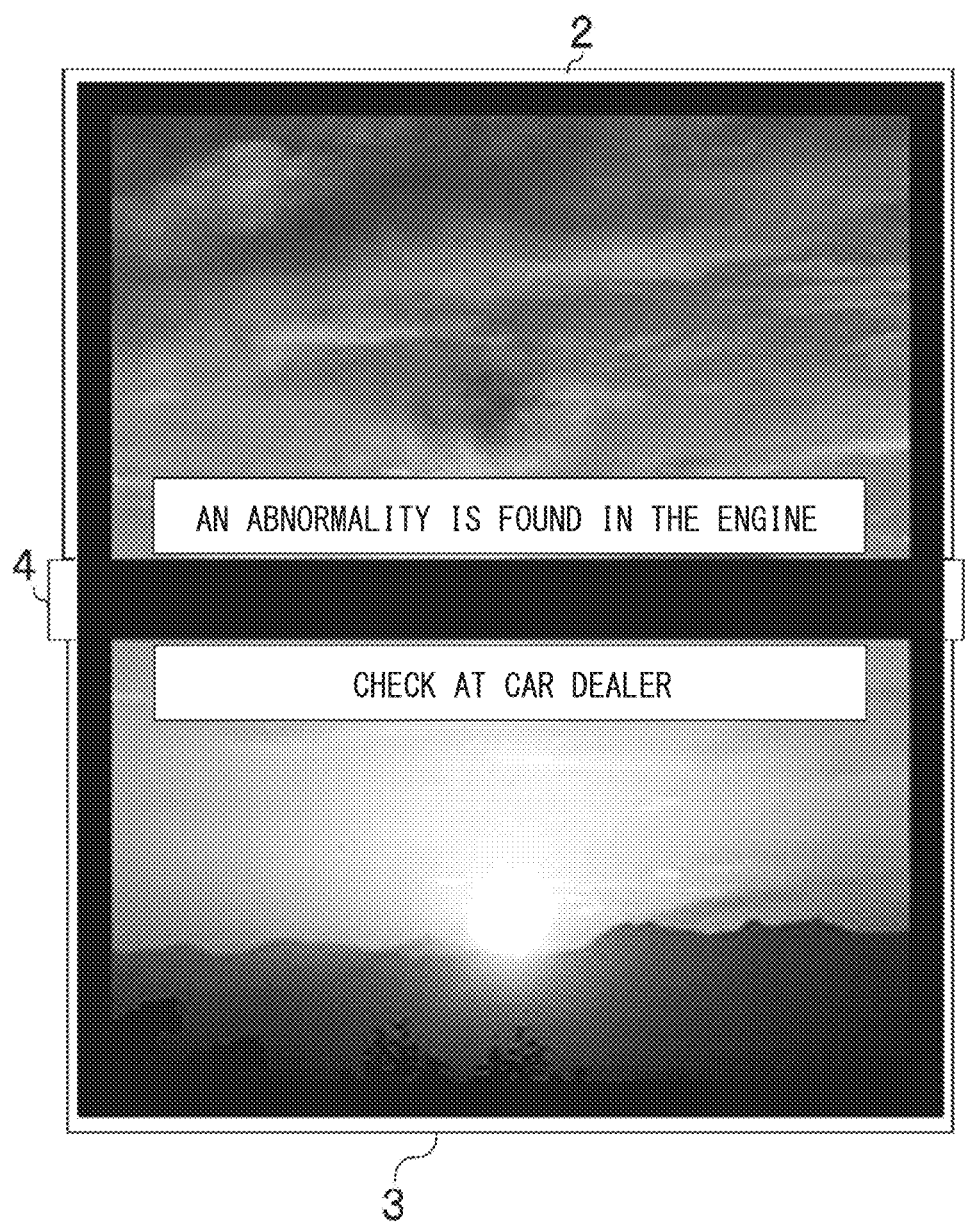
FIG. 14 is a diagram showing part 11 of the example of a display mode.

As shown in FIG. 14, there is a case where the displays 2 and 3 are arranged side by side on two vertical screens and the non-display area 4 is positioned between them. When the contents of the word and the sentence overlaps the non-display area 4, it may be desirable to display the word and the sentence on either one of the display 2 or 3 instead of cutting off the word and the sentence to delete them which overlap the non-display area 4. In the example shown in FIG. 14, since the content of the text "Check at car dealer" overlaps in the non-display area 4, the text is displayed on the display 3 without cutting off the content of the text. As a result, it is possible to display on the display 3 important content related to the safety of the vehicle, such as "Check at car dealer."

Also, in such a display, the contents of the sentences arranged side by side in the vicinity of the lower part of the display 2 and the upper part of the display 3 are displayed and superimposed on the image contents, so that the contents can be confirmed at a glance. In this case, when displaying the text in the non-display area 4 interposed therebetween, the display 2 or 3 may display the text in one sentence. In particular, when the determination unit 11b determines that the importance level of the sentence is higher than the predetermined value, the display processing unit 13 may preferably display the text in one sentence. This makes it easier for the user to read the content of the text.

Next, a case where the text content is converted into voice message by the sound processing unit 14 to output the voice message will be described. Also, the sound processing unit 14 may simultaneously convert the text content into the voice message and output the voice message from the speaker 18.

Even when the sound processing unit 14 outputs the voice message relating to the text content, the determination unit 11b of the information processing device 10 may determine whether to cut off a part of the display located in the non-display area 4 according to the level of importance of the information necessary for the user.

When the sound processing unit 14 outputs to read the text content, as illustrated in FIG. 12, it may be preferable that the display processing unit 13 performs the display processing for displaying the text content on either one of the display screens of the displays 2 and 3 when the determination unit 11b determines that the importance level of the text content relating to the engine anomaly is higher than the predetermined level. In this case, useful information can be accurately provided to the user.

On the other hand, when the sound processing unit 14 outputs to read the text content, as illustrated in FIG. 13, it may be preferable that the display processing unit 13 cuts off a part of the display image located in the non-display area 4 and does not display the part of the display image on any of the display screens of the displays 2 and 3, according to the determination result of the determination unit 11b. This is particularly effective in case of eliminating the troublesomeness of the text display when outputting to read the text content.

According to the present embodiment, the display processing unit 13 changes the display mode of the content based on whether or not the content is information necessary for the user determined by the determination unit 11b and information urging an user action. Therefore, even if the non-display area 4 exists between the first display screen of the first display 2 and the second display screen of the second display 3, the continuity of the image is maintained as much as possible, and the information important to the user and urging the user action and the information necessary for the user are accurately provided to the user without omission.

Second Embodiment

In this embodiment, a mode applied to a general display system that is not related to vehicle use will be described with reference to FIGS. 15 to 18. When applied to a display system other than a vehicle, it can be realized by omitting the configuration of the passenger monitor 22 and the like in the first embodiment. Illustration is omitted.

As described in the above embodiment, when the determination unit 11b of the control device 11 determines that the information is not necessary for the user, the display processing unit 13 cuts off a part of the image content overlapping the non-display area 4 and arranged at the non-display area 4 in S3 of FIG. 4, allocates the image content to each of the displays 2 and 3 in S4, and outputs the image content to the displays 2 and 3 in S5. As a result, a part of the content of the image overlapping the non-display area 4 can be hidden from both the first display screen of the first display 2 and the second display screen of the second display 3.

When applied to general public displays, the hidden content relates to the content that is of relatively low urgency or importance, such as advertisements, play-back videos displayed on screens at stadiums, and the like, videos of performances, player information, and the like. When applied to a small terminal such as a tablet, the relevant content is content of relatively low urgency or importance, such as secondary content attached to the main content, for example, landscape paintings, backgrounds, and advertisements.

On the other hand, when the display processing unit 13 determines that the information is necessary for the user or information leading to the user's action based on the determination result of the determination unit 11b, the display processing unit 13 determines "YES" in S10 of FIG. 4, simply divides the content of the image without cutting off a part of the content of the image located in the display area 4 and overlapping the non-display area 4, reduces the size of the image at S11, allocates the content of the image to each display 2, 3 at S12, and outputs the content of the image to the displays 2 and 3. The content of the text may be divided into characters and displayed on either display screen of the displays 2 and 3. Since the display processing unit 13 performs the display processing for displaying the content located in the non-display area 4 on one of the display screens of the displays 2 and 3 without cutting off the content, it is possible to provide useful image content to the user.

Figure 15:
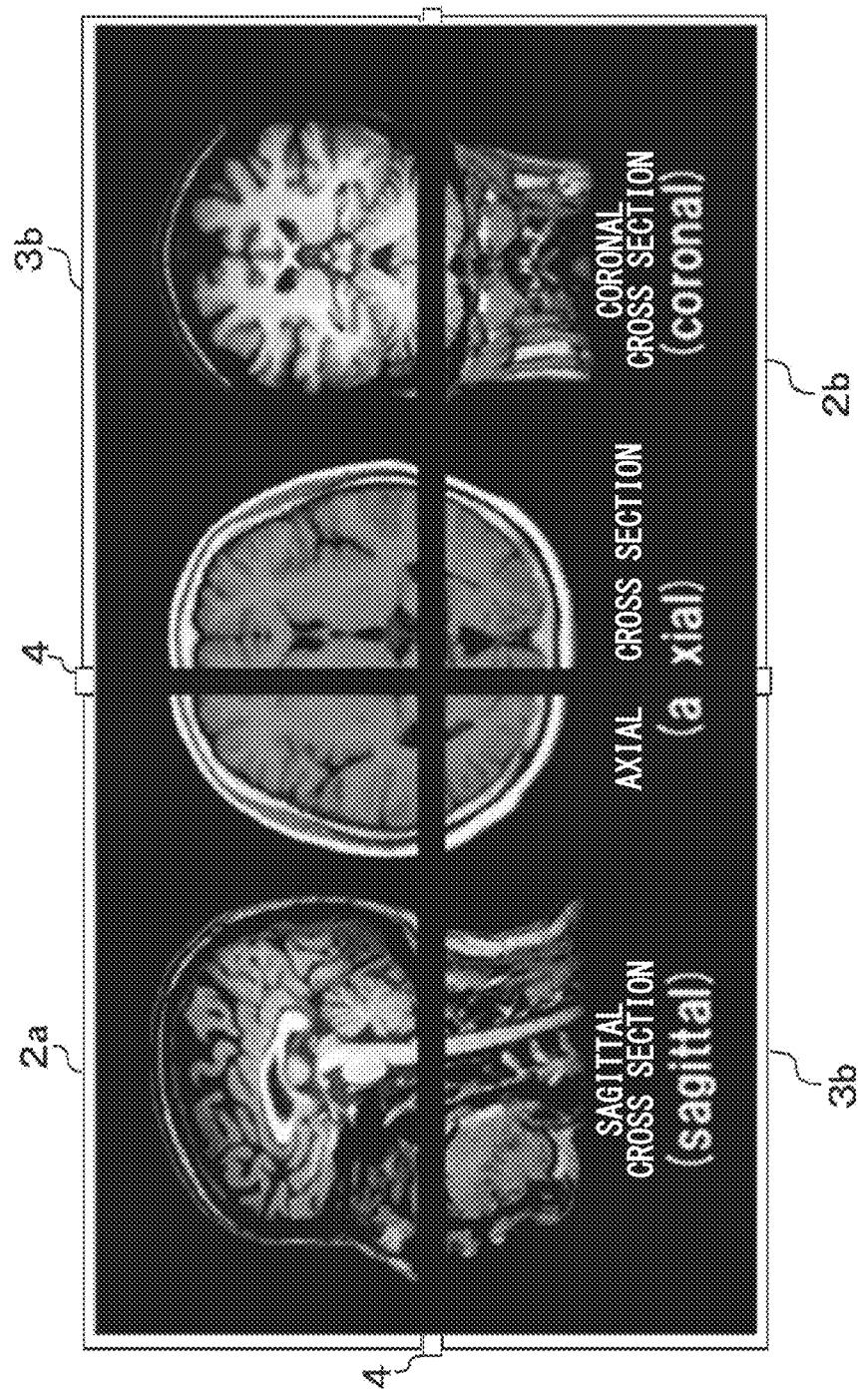
FIG. 15 is a diagram showing part 12 of the example of a display mode according to a second embodiment.

For example, when applied to medical applications, as shown in FIG. 15, the content located in the non-display area 4 is displayed on one of a plurality of display screens for diagnostic images such as remote surgery operation screens, X-ray CT, and MRI, so that it is possible to provide useful content to the user such as medical staff and nurses. In the contents illustrated in FIG. 15, diagnostic images of the human head are displayed using four screens of four displays 2a, 2b, 3a, and 3b.

As shown in FIG. 15, a part of the text content for the "axial cross section" and "axial" and the content for the horizontal slice image in the brain are cut off by the non-display area 4. However, the display processing unit 13 displays all of the content of text and the content of the horizontal slice image of the brain on any one of the displays 2a, 2b, 3a, and 3b. Since all the content of the horizontal slice image in the brain is displayed, users such as medical staff and nurses are less likely to misunderstand even if they observe the content of the horizontal slice image in the brain in detail.

Figure 16:
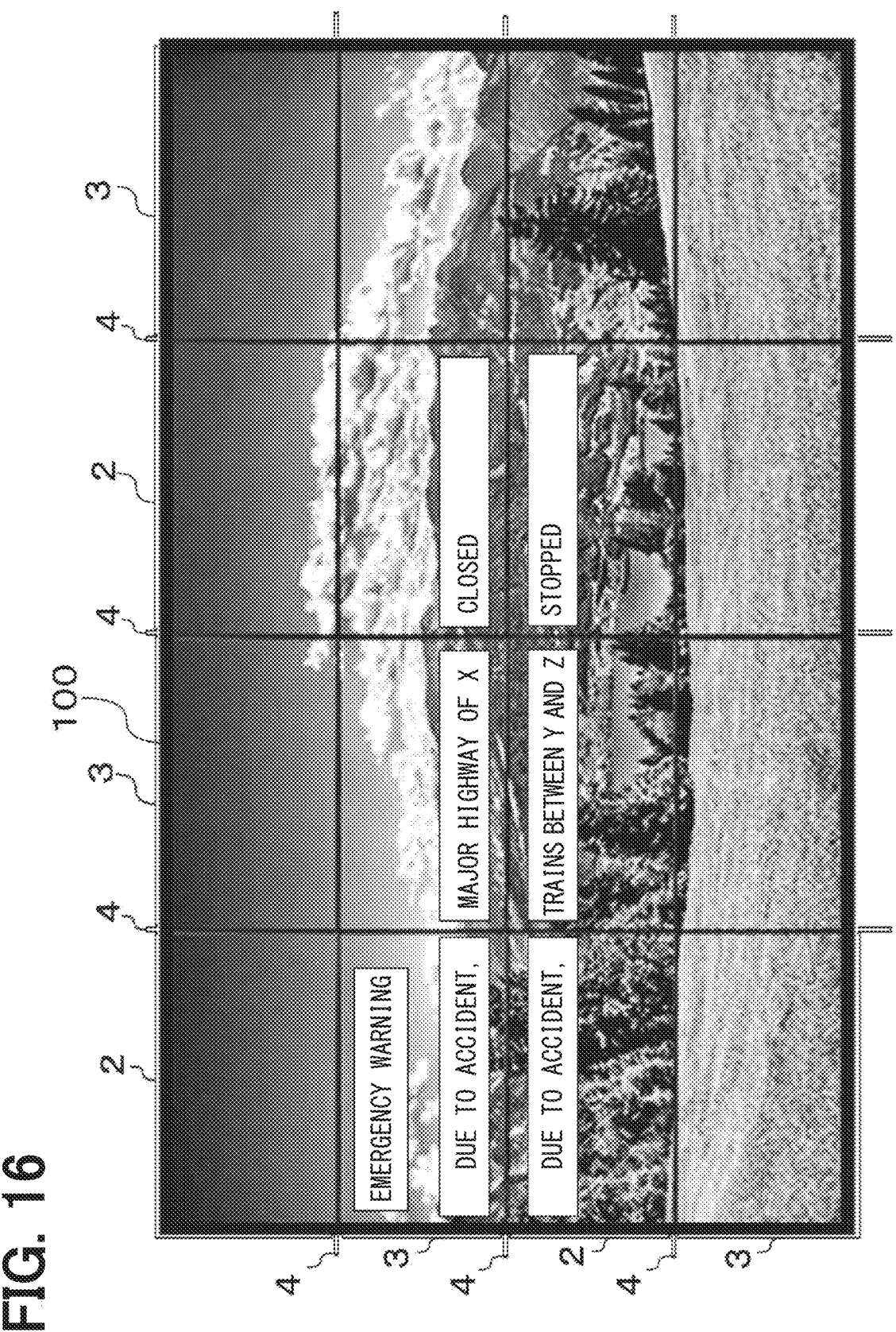
FIG. 16 is a diagram showing part 13 of the example of a display mode.

For example, as shown in FIG. 16, when applied to general display on the screen 100 for advertisement purposes or stadiums, and the like, it is possible to provide useful content to the user by displaying the content such as disaster information such as earthquakes and tsunamis, traffic information of public transportations, information such as terrorism, and the like on any of the display screens of the displays 2 and 3.

For example, even when it is applied to display applications on tablets, smartphones, and the like, it can be applied when the information is necessary for the user, such as the amount display on the purchase screen of a game screen or an EC site. When the image content is information necessary for the user or information that leads to the user's actions, it is possible to display and provide useful content to the user by displaying the image content on one of the display screens of the plurality of displays 2 and 3.

Figure 17:
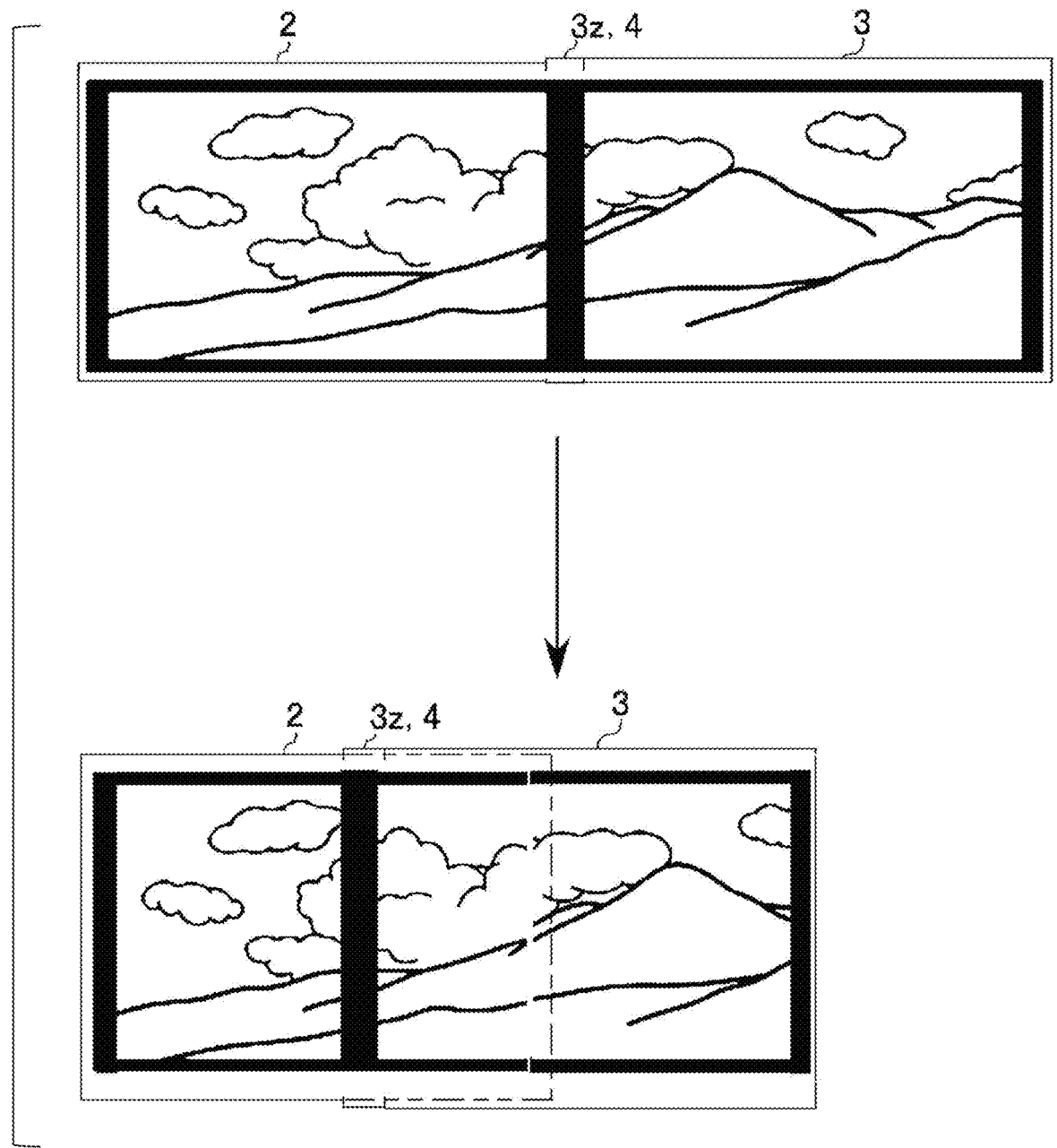
FIG. 17 is a diagram showing part 14 of the example of a display mode.

Next, a case will be described in which one of the displays 2 and 3 is physically moved when one or both of the displays 2 and 3 are physically movable. As shown in FIG. 17, consider the case where the display 3 of the displays 2 and 3 is physically moved so as to overlap the surface of the display 2. In FIG. 17, the outer frame 3z of the display 3 corresponds to the black belt-shaped non-display area 4.

When the display 3 is physically moved, the control device 11 detects signals from the absolute position detection sensors mounted on the displays 2 and 3, the movement values of the drive actuators when the displays 2 and 3 are physically moved, and the like, so that the device 11 determines the relative positional relationship between the displays 2 and 3.

The display processing unit 13 performs the display processing by changing the content of the image to be displayed on the display screen of the display 3 based on the width of the outer frame 3z as well as synchronizing with this relative positional relationship. At this time, it may be desirable to perform the display processing so that the content located in the non-display area 4 is connected between the display screens of the displays 2 and 3 and visually recognized.

In the example shown in FIG. 17, when the hardware of the display 3 is physically moved onto the display screen of the display 2, the display processing unit 13 causes the display screen of the display 3 to change the display image. When the user confirms the display screens of the displays 2 and 3, the scenery including the mountains can be visually recognized as if the displays 2 and 3 are connected. Similar effects to those of the first embodiment are obtained when the present embodiment is applied to the general display, game display, and movable displays 2 and 3.

OTHER EMBODIMENTS

The present disclosure is not limited to the embodiments described above, but can be implemented by various modifications, and can be applied to various embodiments without departing from the spirit of the present disclosure.

In the flowchart illustrated in FIG. 4 in the above embodiment, the image is reduced in S11, alternatively, the image may not be reduced. In this case, both ends of the content protrude from the display and are not displayed.

In the above-described embodiment, it is determined whether the information is necessary for the user for each content, alternatively, the present embodiment may not be limited to this feature. For example, it may be determined whether a part of one content overlapping the non-display area 4 includes the necessary information, and whether or not to cut the part overlapping the non-display area 4. For example, in a map display screen using a navigation function, if important information does not overlap the non-display area 4, the part overlapping the non-display area 4 may be cut off and displayed, and if important information overlaps the non-display area 4, the part overlapping the non-display area 4 may be divided and displayed without cutting off the part.

Figure 18:
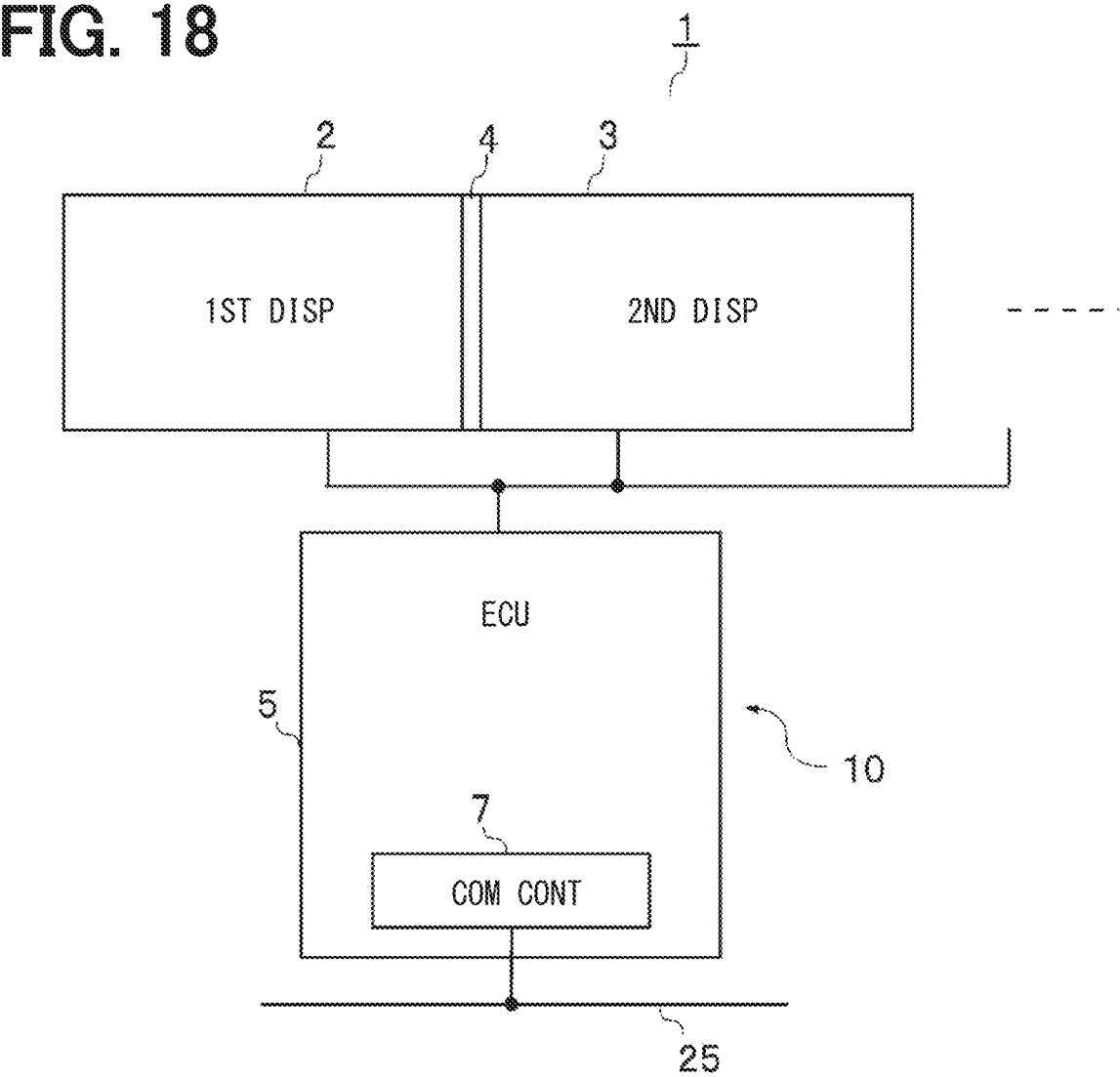
FIG. 18 is an explanatory diagram showing a configuration example of a display and a control image in a modified example.
Figure 19:
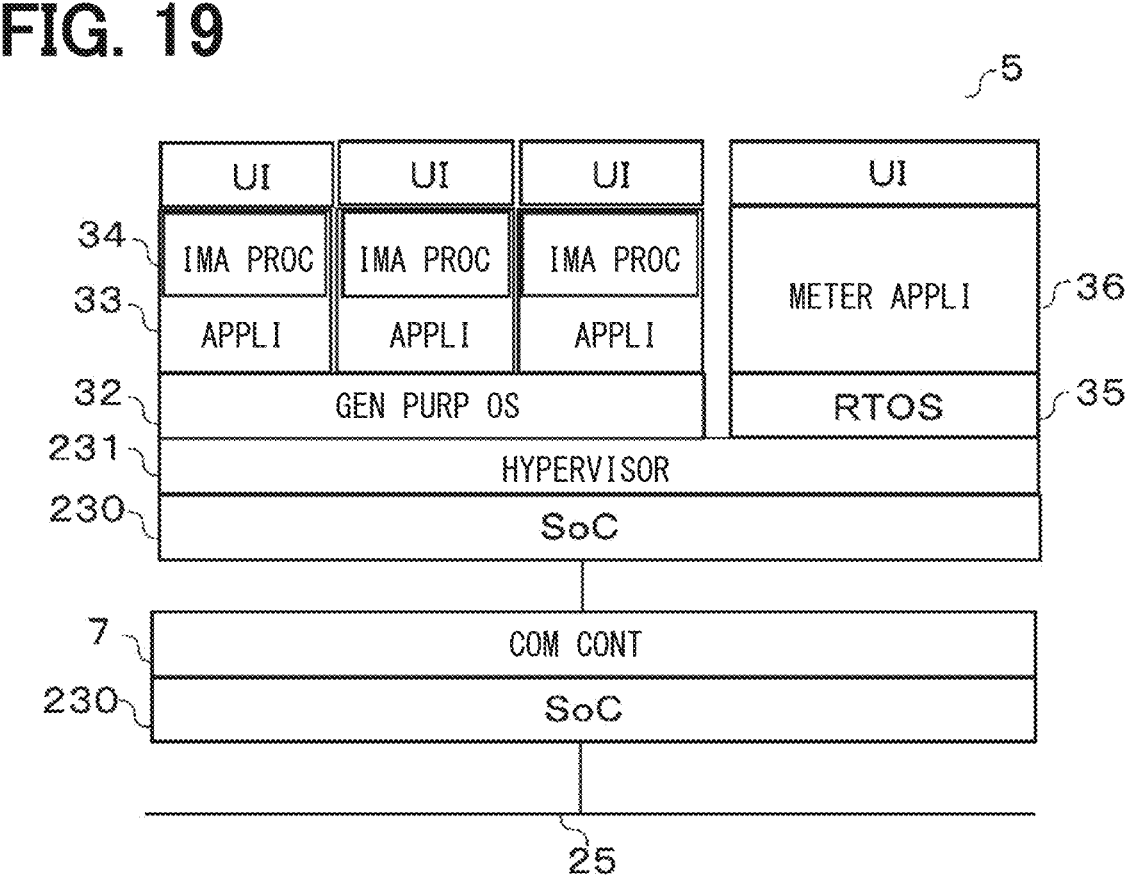
FIG. 19 is a configuration diagram schematically showing hardware and software in a modified example.

In the above-described embodiment, the display system ECU is configured by a plurality of ECUs. Alternatively, as shown in FIG. 18, the display system ECU may be configured as an HCU by one ECU. FIG. 19 shows an example of hardware and software configuration at this time. An SoC 230 is mounted on each ECU 5, and a microcomputer is incorporated in the SoC 230 mounted on each ECU 5. A general-purpose OS 32 and a real-time OS 35 are configured on a hypervisor 231 of the microcomputer incorporated in the SoC 230 of the ECU 5. A plurality of various applications 33 are configured to operate on the general-purpose OS 32. Also, the real-time OS 35 can perform processing with higher real-time performance than the general-purpose OS 32. A meter application 36 is configured to operate on the real-time OS 35. Even if such a configuration is employed, the same configuration and effects as those of the above-described embodiment can be obtained.

In the drawing, reference 2 is a first display, reference 3 is a second display, reference 11*b* is a determination unit, reference 13 is a display processing unit, and reference 14 is a sound processing unit.

The control circuit and the method executed by the control device 11 described in the present disclosure may be implemented by a dedicated computer including a processor programmed to execute one or more functions embodied by a computer program and a memory. Alternatively, the control device 11 and the method according to the present disclosure may be achieved by a dedicated computer including a processor with one or more dedicated hardware logic circuits. Alternatively, the control device 11 and the method according to the present disclosure may be achieved using one or more dedicated computers including a combination of the processor and the memory programmed to execute one or more functions and the processor with one or more hardware logic circuits. The computer program may also be stored on a computer readable and non-transitory tangible recording medium as instructions executed by a computer.

The present disclosure has been described in accordance with the embodiments. However, it is to be understood that the present disclosure is not limited to the embodiments and structure. The present disclosure covers various modification examples and equivalents thereof. In addition, various combinations and modes, as well as other combinations and modes including only one element, more, or less, are within the scope and idea of the present disclosure.

It is noted that a flowchart or the processing of the flowchart in the present application includes sections (also referred to as steps), each of which is represented, for instance, as S901. Further, each section can be divided into several sub-sections while several sections can be combined into a single section. Furthermore, each of thus configured sections can be also referred to as a device, module, or means.

What is claimed is:

1. A vehicle display system for displaying on a first display screen of a first display and a second display screen of a second display arranged side by side with a non-display area sandwiched between the first display screen and the second display screen, the vehicle display system comprising:
   a determination unit that determines whether content includes information necessary for a user who visually recognizes the first display screen and the second display screen when the content, having an integrated image, an integrated text, an integrated character or an integrated symbol, is displayed across the first display screen and the second display screen to bridge the non-display area, wherein the determination unit determines whether to cut off a part of the content located in the non-display area according to a level of importance of the information necessary for the user; and
   a display processing unit that displays the content by changing a display area of the content to be displayed on the first display screen and the second display screen based on a determination result of the determination unit,
   wherein
      when the level of the importance of the information is higher than a predetermined level, the part of the content located in the non-display area is displayed by changing the display area of the part of the content without cutting off the part of the content,
      when the level of the importance of the information is not higher than the predetermined level, the part of the content located in the non-display area is cut off and is not displayed on both the first display screen and the second display screen,
      the content with the level of the importance of the information that is higher than the predetermined level includes content whose display is necessary to be updated in real time and has a real-time performance that is higher than a pre-determined real-time performance,
      the content whose display is necessary to be updated in real time is processed by a real-time operating system that is capable of processing with higher real-time performance than a general-purpose operating system, and
      when the level of the importance of the information is higher than the predetermined level, the display processing unit divides the content at a center position of the non-display area into two halves, and displays the two halves on the first display and the second display, respectively.

2. The vehicle display system according to claim 1, wherein when the determination unit determines that the information is not necessary for the user, the display processing unit cuts off a part of the content overlapping the non-display area and hides the part of the content overlapping the non-display area on both the first display screen and the second display screen.

3. The vehicle display system according to claim 1, wherein, when the determination unit determines that the information is necessary for the user, the display processing unit displays a part of the content located in the non-display area on one of the first display screen and the second display screen or divides the part of the content to display the part of the content.

4. The vehicle display system according to claim 3, wherein the display processing unit displays a part of the content located in the non-display area on any one of a plurality of display screens in accordance with the information that changes sequentially with time when the content relates to safety and security in case of applying the vehicle display system to a vehicle application.

5. The vehicle display system according to claim 1, wherein the information necessary for the user includes at least one of warning information, guidance information, and notification information leading to an action of the user.

6. The vehicle display system according to claim 1, wherein the display processing unit blurs at least a part of the content arranged at a screen edge where the first display screen and the second display screen are adjacent to each other.

7. The vehicle display system according to claim 1, wherein, when displaying a part of the content located in the non-display area using a predetermined color, the display processing unit displays the content arranged at a screen edge where the first display screen and the second display screen are adjacent to each other using a similar color of the predetermined color in the non-display area.

8. The vehicle display system according to claim 1, wherein, when the first display screen or the second display screen is moved physically, the display processing unit performs display processing for visual recognition of a part of the content located in the non-display area by connecting the part of the content between the first display screen and the second display screen.

9. The vehicle display system according to claim 1, further comprising a sound processing unit that outputs a voice message corresponding to the content of the integrated text or the integrated character, wherein, when outputting the voice message corresponding to the content of the integrated text or the integrated character, the display processing unit cuts off a part of the content located in the non-display area based on a determination result of the determination unit and hides the part of the content on both the first display screen and the second display screen.

10. The vehicle display system according to claim 1, further comprising one or more processors providing at least one of the determination unit and the display processing unit.

11. A display system for displaying on a first display screen of a first display and a second display screen of a second display arranged side by side with a non-display area sandwiched between the first display screen and the second display screen, the display system comprising:

a determination unit that determines whether content includes information necessary for an user who visually recognizes the first display screen and the second display screen when the content, having an integrated image, an integrated text, an integrated character or an integrated symbol, is displayed across the first display screen and the second display screen to bridge the non-display area, wherein the determination unit determines whether to cut off a part of the content located in the non-display area according to a level of importance of the information necessary for the user; and a display processing unit that displays the content by changing a display area of the content to be displayed on the first display screen and the second display screen based on a determination result of the determination unit, wherein when the level of the importance of the information is higher than a predetermined level, the part of the content located in the non-display area is displayed by changing the display area of the part of the content without cutting off the part of the content, when the level of the importance of the information is not higher than the predetermined level, the part of the content located in the non-display area is cut off and is not displayed on both the first display screen and the second display screen, the content with the level of the importance of the information that is higher than the predetermined level includes content whose display is necessary to be updated in real time and has a real-time performance that is higher than a predetermined real-time performance, the content whose display is necessary to be updated in real time is processed by a real-time operating system that is capable of processing with higher real-time performance than a general-purpose operating system, and when the level of the importance of the information is higher than the predetermined level, the display processing unit divides the content at a center position of the non-display area into two halves, and displays the two halves on the first display and the second display, respectively.

12. The display system according to claim 11, further comprising:

one or more processors, wherein:

the one or more processors provides at least one of the determination unit; and the display processing unit.

13. A vehicle display system for displaying on a first display screen of a first display and a second display screen of a second display arranged side by side with a non-display area sandwiched between the first display screen and the second display screen, the vehicle display system comprising:

a determination unit that determines whether content includes information necessary for a user who visually recognizes the first display screen and the second display screen when the content, having an integrated image, an integrated text, an integrated character or an integrated symbol, is displayed across the first display screen and the second display screen to bridge the non-display area;

a display processing unit that displays the content by changing a display area of the content to be displayed on the first display screen and the second display screen based on a determination result of the determination unit; and a sound processing unit that outputs a voice message corresponding to the content of the integrated text or the integrated character, wherein when outputting the voice message corresponding to the content of the integrated text or the integrated character, the determination unit determines whether to cut off a part of the content located in the non-display area according to a level of importance of the information necessary for the user, when the level of the importance of the information is higher than a predetermined level, the part of the content located in the non-display area is displayed by changing the display area of the part of the content without cutting off the part of the content, when the level of the importance of the information is not higher than the predetermined level, the part of the content located in the non-display area is cut off and is not displayed on both the first display screen and the second display screen, the content with the level of the importance of the information that is higher than the predetermined level includes content whose display is necessary to be updated in real time and has a real-time performance that is higher than a predetermined real-time performance, the content whose display is necessary to be updated in real time is processed by a real-time operating system that is capable of processing with higher real-time performance than a general-purpose operating system, and when the level of the importance of the information is higher than the predetermined level, the display processing unit divides the content at a center position of the non-display area into two halves, and displays the two halves on the first display and the second display, respectively.

14. A display method for displaying on a first display screen of a first display and a second display screen of a second display arranged side by side with a non-display area sandwiched between the first display screen and the second display screen, the display method comprising:

by a determination unit, determining whether content includes information necessary for an user who visually recognizes the first display screen and the second display screen when the content, having an integrated image, an integrated text, an integrated character or an integrated symbol, is displayed across the first display screen and the second display screen to bridge the non-display area, wherein the determination unit determines whether to cut off a part of the content located in the non-display area according to a level of importance of the information necessary for the user; and by a display processing unit, displaying the content by changing a display area of the content to be displayed on the first display screen and the second display screen based on a determination result of the determination unit, wherein when the level of the importance of the information is higher than a predetermined level, the part of the content located in the non-display area is displayed by changing the display area of the part of the content without cutting off the part of the content, when the level of the importance of the information is not higher than the predetermined level, the part of the content located in the non-display area is cut off and is not displayed on both the first display screen and the second display screen, the content with the level of the importance of the information that is higher than the predetermined level includes content whose display is necessary to be updated in real time and has a real-time performance that is higher than a predetermined real-time performance, the content whose display is necessary to be updated in real time is processed by a real-time operating system that is capable of processing with higher real-time performance than a general-purpose operating system, and when the level of the importance of the information is higher than the predetermined level, the display processing unit divides the content at a center position of the non-display area into two halves, and displays the two halves on the first display and the second display, respectively.

15. A non-transitory tangible computer readable storage medium comprising instructions being executed by a computer, the instructions including a computer-implemented method for displaying on a first display screen of a first display and a second display screen of a second display arranged side by side with a non-display area sandwiched between the first display screen and the second display screen, the instructions causing:

a determination unit to determine whether content includes information necessary for an user who visually recognizes the first display screen and the second display screen when the content, having an integrated image, an integrated text, an integrated character or an integrated symbol, is displayed across the first display screen and the second display screen to bridge the non-display area, wherein the determination unit determines whether to cut off a part of the content located in the non-display area according to a level of importance of the information necessary for the user; and a display processing unit to display the content by changing a display area of the content to be displayed on the first display screen and the second display screen based on a determination result of the determination unit, wherein when the level of the importance of the information is higher than a predetermined level, the part of the content located in the non-display area is displayed by changing the display area of the part of the content without cutting off the part of the content, when the level of the importance of the information is not higher than the predetermined level, the part of the content located in the non-display area is cut off and is not displayed on both the first display screen and the second display screen, the content with the level of the importance of the information that is higher than the predetermined level includes content whose display is necessary to be updated in real time and has a real-time performance that is higher than a predetermined real-time performance, the content whose display is necessary to be updated in real time is processed by a real-time operating system that is capable of processing with higher real-time performance than a general-purpose operating system, and when the level of the importance of the information is higher than the predetermined level, the display processing unit divides the content at a center position of the non-display area into two halves, and displays the two halves on the first display and the second display, respectively.

16. A display system for displaying on a first display screen of a first display and a second display screen of a second display arranged side by side with a non-display area sandwiched between the first display screen and the second display screen, the display system comprising:

a determination unit that determines whether content includes information necessary for a user who visually recognizes the first display screen and the second display screen when the content, having an integrated image, an integrated text, an integrated character or an integrated symbol, is displayed across the first display screen and the second display screen to bridge the non-display area;

a display processing unit that displays the content by changing a display area of the content to be displayed on the first display screen and the second display screen based on a determination result of the determination unit; and a sound processing unit that outputs a voice message corresponding to the content of the integrated text or the integrated character, wherein when outputting the voice message corresponding to the content of the integrated text or the integrated character, the determination unit determines whether to cut off a part of the content located in the non-display area according to a level of importance of the information necessary for the user, when the level of the importance of the information is higher than a predetermined level, the part of the content located in the non-display area is displayed by changing the display area of the part of the content without cutting off the part of the content, when the level of the importance of the information is not higher than the predetermined level, the part of the content located in the non-display area is cut off and is not displayed on both the first display screen and the second display screen, the content with the level of the importance of the information that is higher than the predetermined level includes content whose display is necessary to be updated in real time and has a real-time performance that is higher than a predetermined real-time performance, the content whose display is necessary to be updated in real time is processed by a real-time operating system that is capable of processing with higher real-time performance than a general-purpose operating system, and when the level of the importance of the information is higher than the predetermined level, the display processing unit divides the content at a center position of the non-display area into two halves, and displays the two halves on the first display and the second display, respectively.

17. A display method for displaying on a first display screen of a first display and a second display screen of a second display arranged side by side with a non-display area sandwiched between the first display screen and the second display screen, the display method comprising:

by a determination unit, determining whether content includes information necessary for a user who visually recognizes the first display screen and the second display screen when the content, having an integrated image, an integrated text, an integrated character or an integrated symbol, is displayed across the first display screen and the second display screen to bridge the non-display area;

by a display processing unit, displaying the content by changing a display area of the content to be displayed on the first display screen and the second display screen based on a determination result of the determination unit; and by a sound processing unit, outputting a voice message corresponding to the content of the integrated text or the integrated character, wherein when outputting the voice message corresponding to the content of the integrated text or the integrated character, the determination unit determines whether to cut off a part of the content located in the non-display area according to a level of importance of the information necessary for the user, when the level of the importance of the information is higher than a predetermined level, the part of the content located in the non-display area is displayed by changing the display area of the part of the content without cutting off the part of the content, when the level of the importance of the information is not higher than the predetermined level, the part of the content located in the non-display area is cut off and is not displayed on both the first display screen and the second display screen, the content with the level of the importance of the information that is higher than the predetermined level includes content whose display is necessary to be updated in real time and has a real-time performance that is higher than a predetermined real-time performance, the content whose display is necessary to be updated in real time is processed by a real-time operating system that is capable of processing with higher real-time performance than a general-purpose operating system, and when the level of the importance of the information is higher than the predetermined level, the display processing unit divides the content at a center position of the non-display area into two halves, and displays the two halves on the first display and the second display, respectively.

18. A non-transitory tangible computer readable storage medium comprising instructions being executed by a computer, the instructions including a computer-implemented method for displaying on a first display screen of a first display and a second display screen of a second display arranged side by side with a non-display area sandwiched between the first display screen and the second display screen, the instructions causing:

a determination unit to determine whether content includes information necessary for an user who visually recognizes the first display screen and the second display screen when the content, having an integrated image, an integrated text, an integrated character or an integrated symbol, is displayed across the first display screen and the second display screen to bridge the non-display area;

a display processing unit to display the content by changing a display area of the content to be displayed on the first display screen and the second display screen based on a determination result of the determination unit; and a sound processing unit to output a voice message corresponding to the content of the integrated text or the integrated character, wherein when outputting the voice message corresponding to the content of the integrated text or the integrated character, the determination unit determines whether to cut off a part of the content located in the non-display area according to a level of importance of the information necessary for the user, when the level of the importance of the information is higher than a predetermined level, the part of the content located in the non-display area is displayed by changing the display area of the part of the content without cutting off the part of the content, when the level of the importance of the information is not higher than the predetermined level, the part of the content located in the non-display area is cut off and is not displayed on both the first display screen and the second display screen, the content with the level of the importance of the information that is higher than the predetermined level includes content whose display is necessary to be updated in real time, has a real-time performance that is higher than a predetermined real-time performance, the content whose display is necessary to be updated in real time is processed by a real-time operating system that is capable of processing with higher real-time performance than a general-purpose operating system, and when the level of the importance of the information is higher than the predetermined level, the display processing unit divides the content at a center position of the non-display area into two halves, and displays the two halves on the first display and the second display, respectively.

* * * * *